United States Patent [19]

Lange

[11] 4,322,612

[45] Mar. 30, 1982

[54] SELF-SERVICE WAGERING SYSTEM

[75] Inventor: Le Roy J. Lange, Towson, Md.

[73] Assignee: General Instrument Corporation, Clifton, N.J.

[21] Appl. No.: 87,026

[22] Filed: Oct. 22, 1979

[51] Int. Cl.³ .......................... G06F 7/02; A63B 71/06

[52] U.S. Cl. ................................ 235/419; 235/92 TP; 235/431; 273/138 A

[58] Field of Search ................... 235/92 TP, 384, 385, 235/419, 431

[56] References Cited

U.S. PATENT DOCUMENTS

| | | | |
|---|---|---|---|
| 3,124,674 | 3/1964 | Edwards et al. | 235/ |
| 3,327,292 | 6/1967 | Ericksson . | |
| 3,487,905 | 1/1970 | James, Sr. | 194/4 |
| 3,560,715 | 2/1971 | Akamatsu et al. . | |
| 3,634,656 | 1/1972 | Krechmer et al. . | |
| 3,778,595 | 12/1973 | Hatanaka et al. | 340/149 A |
| 3,810,627 | 5/1974 | Levy | 235/92 TA |
| 3,874,584 | 4/1975 | Foley | 235/92 TP |
| 3,984,660 | 10/1976 | Oka et al. . | |
| 4,068,213 | 1/1978 | Nakamura et al. | 340/149 A |
| 4,108,361 | 8/1978 | Krause | 235/375 |
| 4,114,027 | 9/1978 | Slater et al. | 235/419 |

*Primary Examiner*—Donald J. Yusko
*Attorney, Agent, or Firm*—James & Franklin

[57] ABSTRACT

A single cash deposite may be used for multiple race/-multiple day wagering. As a receipt for the deposit, a ticket, having a form upon which a proposed wager may be entered, is issued with a system-generated transaction identification code. The code corresponds to a memory location wherein information concerning credit balance and any outstanding wager is recorded for the transaction. To place a bet, the ticket form is filled in with proposed wager information. The ticket is then inserted into a terminal and read. The memory location corresponding to the code is accessed and any outstanding wager information contained therein is compared to the race results. If same coincide, indicating a winner, the value of the outstanding wager is calculated and added to the stored credit balance. The proposed wager is compared to possible valid wagers on the upcoming race and, if same coincide, the proposed wager is accepted, the value thereof is deducted to update the credit balance, the previous transaction is closed out, and a new code corresponding to the new transaction is assigned. Information concerning the accepted wager and the updated credit balance is stored in the memory as a new transaction record, at a location therein corresponding to the new code. The read ticket is retained and a new ticket is issued containing the new code, an acknowledgment of the credit balance, an acknowledgment of the accepted wager and a form upon which may be entered information relating to a further proposed wager on a subsequent race. Thus, outstanding wagers are paid, completed transactions closed out, proposed wagers accepted and recorded, credit balances updated and a receipt for same issued, all in a single confidential automatic operation.

81 Claims, 18 Drawing Figures

SELF-SERVICE WAGERING SYSTEM

BACKGROUND OF THE INVENTION

The present invention relates to a self-service wagering system and, more particularly, to a system wherein cash handling is minimized and wherein each automated anonymous transaction provides for ticket cashing, bet processing and credit balance updating.

Race tracks and other locations where parimutuel wagering takes place commonly employ data processing equipment which automatically calculates and updates the odds for races based on the number and value of the wagers placed on each horse in the race. The betting information is fed to the data processor as the money is collected and the receipt for each bet is issued.

The bettor, before each race, must be physically present at a central location at the track (or, off-track betting office) where the betting windows are located. The bettor selects the window which corresponds to the value of the bet he wishes to place. Behind the window is an agent who accepts the money and presses the appropriate buttons on a receipt (ticket) issuing machine, such that a receipt is issued with the outstanding wager information concerning the horse, the type of bet ("Win", "Place" or "Show") and the value of the bet thereon. This information is simultaneously transmitted to the data processor which uses this information to continuously update the odds. The bettor retains the receipt and, if the bet has been won, goes to a pay-out window where he submits the receipt to an agent who pays the bettor his winnings.

This system has a number of drawbacks. A separate money transaction is required when each wager is placed. A separate money transaction is required for each pay-out. Thus, a large number of agents are required, each of which handles a great deal of money, usually in small bills. For security reasons, it is necessary that these agents be located at a central location. Because of the great number of individual manual transactions, the potential for human error is great. Each transaction is time consuming and a great deal of time is wasted waiting in lines. Since all of the wagering must take place at a central location, the bettors are required to come from all parts of the track to place their bets. This is inconvenient to the bettors. Moreover, there is little confidentiality for the bettor, as any observer situated near the windows can see which bettors are betting what amounts and which bettors are being paid, by merely observing the lines in front of the windows.

Systems have been proposed to overcome some of these problems. For instance, in U.S. Pat. No. 3,124,674 issued Mar. 10, 1964 and entitled "Data Collection And Distribution System", upon entering the track, the bettor purchases a number of credit tickets, each of which represents a particular dollar amount ($2, $5, $10, etc.). Thus, theoretically, there need be only a single money deposit, if the amount of the deposit is sufficient to cover all bets on all of the races. To place a bet, the customer inserts a credit ticket of the desired denomination into a terminal and enters information on a keyboard to indicate the desired bet (the number of the race, the horse, and the type of bet). The terminal records the information on the ticket and the ticket is returned to the bettor as a receipt. If the bettor is a winner, the winnings are paid in the customary fashion, by bringing the ticket to a cashier. No current balance is maintained because each transaction is paid for separately, although at one time.

This system, however, to be more efficient than the conventional method, requires that the bettor decide, upon entering the track, the denomination of each of the bets he will place during the day. Otherwise, a separate money purchase would still be required for each bet. This decision is often impossible in advance because it may depend in large part upon whether the bettor has won or not on previous bets during the day and other factors. It therefore, in the practical situation, does not provide for a single cash transaction to place all bets and does not provide the bettor with an updated account of his balance. This system also requires that a plurality of tickets be handled and held by the bettor.

U.S. Pat. No. 3,327,292 entitled "Race Track Betting Data Handling System" discloses a betting terminal which is very much like a vending machine wherein the bettor inserts the money and enters the betting information on a keyboard. The information is recorded and a receipt issued. In order to collect on the bet, the receipt is brought to a cashier. Thus, in this patent, each transaction (bet and/or payout) is separate and requires money to be handled and no current balance is maintained. This is merely an attempt to substitute an automatic vending type machine for an agent. It therefore has all of the inheritant drawbacks of the use of a vending machine, particularly the difficulties relating to recognizing and accepting currency.

In U.S. Pat. No. 4,108,361 entitled "Universal Mark Sense Betting Terminal System And Method", a blank slip is filled out by the bettor and inserted into a machine. An agent at the machine collects the appropriate amount of money. The agent notifies the terminal that he has been paid, the bet is recorded and a receipt is printed. Thus, the presence of an agent to handle the money for each transaction is required as each bet is paid for separately and each winner is paid manually.

Thus, in the systems proposed by U.S. Pat. Nos. 3,327,292 and 4,108,361, each transaction must be paid for and paid out separately, thereby requiring a great deal of money handling, time, inconvenience and, in the latter instance, the presence of a large number of agents. With respect to the former patent, where the money is taken in vending machine style, coins or tokens must be used to place each bet, which is extremely inconvenient. The system of U.S. Pat. No. 3,124,674 alleviates this problem but creates the additional problem that the bettor must decide in advance what denomination tickets and, thus, how much he will bet for each race, and deposit a sum of money to cover bets on several races instead of only one race, if the system is to function properly. If the bettor has to buy a ticket before each race, then the efficiency of the system is defeated.

A number of systems for automatic banking are known which issue receipts after each transaction and maintain a current balance for each account. In such systems, however, money is either paid in or paid out for each transaction and the receipt thereof cannot be used for subsequent transactions. There have also been proposed a number of systems for credit card transactions where the customer's current balance is kept on a reusable card which is returned to the customer after each purchase with the updated balance information.

However, none of the previously known automatic banking or credit card transaction systems have the features required for use in parimutuel betting. None of these systems provide a facility for checking whether a wager can be accepted, permit payment for outstanding wagers and acceptance of proposed wagers in a single transaction, or provide a receipt, with a record of credit balance and outstanding transactions to be completed, which can be reused at a later time to complete the transaction, that is, to provide payment. None of these systems provide a form on the reusable ticket to enter information for a further (new) transaction which is automatically recorded when the completed transaction is paid.

It is therefore a primary object of the present invention to provide a self-service wagering system wherein a single cash deposit provides for multiple race/multiple day betting.

It is another object of the present invention to provide a self-service wagering system wherein a single transaction provides ticket cashing, bet processing and credit balance updating.

It is another object of the present invention to provide a self-service wagering system wherein the bettor need not decide in advance the denominations of the bets he will make when the initial cash deposit is made.

It is another object of the present invention to provide a self-service wagering system wherein bets can be conveniently and quickly placed at a plurality of locations remote from the central data processing equipment.

It is another object of the present invention to provide a self-service wagering system wherein deposit amounts, credit information and information concerning outstanding wagers and payouts are maintained anonymously.

It is another object of the present invention to provide a self-service wagering system wherein the bettor is provided, after each transaction, with updated credit balance information.

It is another object of the present invention to provide a self-service wagering system wherein the amounts wagered and won by a particular bettor are confidential.

It is another object of the present invention to provide a self-service wagering system which can be utilized both for on-track and off-track betting operations and which operates simply, efficiently and errorlessly.

In accordance with the present invention, the self-servicing wagering system includes a memory containing the credit balance and information relating to an outstanding wager, for each of a plurality of anonymous ticket transaction records. Information relating to the results of a completed race is also stored in the system. A single ticket bearing an acknowledgment of the stored credit balance, an acknowledgment of the outstanding wagers, a machine-readable ticket transaction record identification code and a form upon which machine-readable information relating to a proposed wager may be entered by the ticket holder, is used for each transaction.

The ticket is inserted into a terminal and the identification code and entered information relating to the proposed wager, if present, is read. The identification code is used to access the memory location corresponding to the ticket transaction record, to obtain the stored credit balance and outstanding wager information for that ticket transaction. The outstanding wager information is used to access the memory location corresponding to the race to which the outstanding wager pertains. The outstanding wager information and the results of the race are compared. If the outstanding wager information coincides with the race results, the value of the outstanding wager is calculated. The calculated value is then added to the credit balance to form an altered balance.

The proposed wager information is compared with possible valid wagers for the race to which it pertains. If this information coincides, the proposed wager is accepted, the value thereof is subtracted from the altered balance to form an updated credit balance and a new identification code corresponding to this transaction is assigned. Information concerning the accepted wager is stored, as is the credit balance information, in the memory location corresponding to the newly assigned identification code.

If the proposed wager is accepted, the ticket previously inserted into the terminal is retained and a new ticket is issued. The new ticket has printed thereon the new ticket transaction record identification code, an acknowledgment of the updated credit balance and an acknowledgment of the accepted wager. In addition, the new ticket bears a form upon which the information relating to the next proposed wager may be entered by the bettor.

The terminal is provided with an entrance port into which the ticket is inserted. After the presence of the ticket is sensed in the entrance port, the ticket is conveyed from the entrance port to a ticket reader. After the ticket is read, it is held in escrow at that location until after the proposed wager has been accepted or rejected.

The identification code is verified as to form. If the form is improper, a rejection signal is generated, an error message displayed and the ticket is returned to the entrance port.

If the proposed wager does not coincide with possible valid wagers, a rejection signal is generated, an error message displayed and the ticket returned to the entrance port. If the proposed wager information coincides with the possible valid wagers, the altered credit balance is tested to determine if same is larger than the value of the proposed wager. If insufficient funds are present to cover the proposed wager, a rejection signal is generated, an error message displayed and the proposed wager rejected. If sufficient funds are present, the proposed wager is accepted and the value of same is deducted from the altered credit balance to form an updated credit balance, which information is stored along with the information concerning the accepted wager.

Upon acceptance of the wager, an acceptance signal is generated which causes a new record ticket transaction identification code to be assigned for the accepted transaction. The ticket being held in escrow is released and conveyed to a storage bin. The acceptance signal also causes a new ticket to be dispensed from a ticket supply and conveyed to a printer which prints thereon the ticket transaction record identification code corresponding to the accepted wager, acknowledgment of the credit balance information, and acknowledgment of the accepted wager. This ticket also contains a form upon which may be entered information concerning a further wager on a subsequent race.

After the race to which the accepted wager pertains has been completed, the bettor marks the form with information concerning a further proposed wager on an upcoming race. He then inserts the ticket into the entrance port of the terminal and the cycle is repeated—paying the winning wager and accepting a new wager. The bettor may repeatedly place wagers in this fashion until his credit balance is depleted or he wishes to be paid out. Only a single transaction is required for each ticket cashing, bet processing and credit balance updating.

The system preferably comprises a central processing unit and a number of remote terminals which are connected through a communication interface. The central processing unit continuously polls each of the terminals in sequence to determine if a transaction is taking place. If it is, the data is received from the remote terminal, processed in the central processing unit and retransmitted back to the terminal. The terminals may be situated at any location, and therefore may be located throughout the track or at conveniently located off-track betting locations.

Pay-in and payout windows may be located at a convenient location such as at the entrance of the track. Upon entering, the bettor pays in an amount equal to the credit balance which he desires. The credit balance is transmitted to the central processing unit which assigns a ticket transaction record identification code, stores the credit information and authorizes a ticket to be printed which contains the ticket transaction record identification code and an acknowledgment of the credit balance. The bettor need not decide in advance the denomination of each of the bets he wishes to place, only the total amount he intends to bet. After the better has placed all of his bets and wishes to paid out, he goes to the payout window with his last ticket. The identification code on the last ticket is used to access the memory to determine the final credit balance and an agent pays the ticket holder accordingly.

In this manner, money handling is greatly reduced as is waiting time. Transactions are quick, easy and errorless. Security and confidentiality are enhanced. The ticket holder always has in his possession a ticket which acts as a receipt for his current balance and any outstanding wagers. The central processing unit also has this information. The same ticket can be used by the bettor to enter a proposed wager and when inserted into the terminal, the central processing unit not only acknowledges and accepts the proposed wager, and alters the credit balance according to any outstanding wagers, but also provides the bettor with a receipt for his transaction with a unique ticket transaction identification code, the current balance information, and a form upon which information pertaining to the next transaction may be entered.

In a second preferred embodiment, storage requirements of the system are reduced by recording the credit balance and outstanding wager information on the ticket in machine-readable form. Thus, this information need no longer be stored in the memory, as it is obtained from the ticket as it is read. The remaining operations of the system remain unchanged, except for the elimination of the necessity of assigning identification codes for each ticket transaction record.

In a third preferred embodiment, transaction processing time is reduced by crediting each transaction record stored in the memory, which has a winning outstanding wager on a particular race, automatically upon completion of the race. This is accomplished by addressing each location in sequence to determine if same contains an outstanding wager pertaining to the race just completed. If so, the stored wager information is compared to the race results and each winning account is automatically credited at that time. This operation, therefore, need not take place during processing of the proposed wager, thus reducing the processing times for accepting proposed wagers.

To the accomplishment of the above, and to such other objects as may hereinafter appear, the present invention relates to a self-service wagering system as described in the following specification and recited in the annexed claims, taken together with the accompanying drawings, wherein like numerals refer to like parts, and in which:

In the present specification, the word "ticket" is used to denote any type of document or medium upon which machine-readable and/or printed matter may be affixed, stamped, punched or otherwise recorded. Thus, the nature of the "ticket" shown need not be confined to the card type document illustrated and the form or character of the "ticket" shown and described herein is not to be considered a limitation on the present invention.

Figure 1:
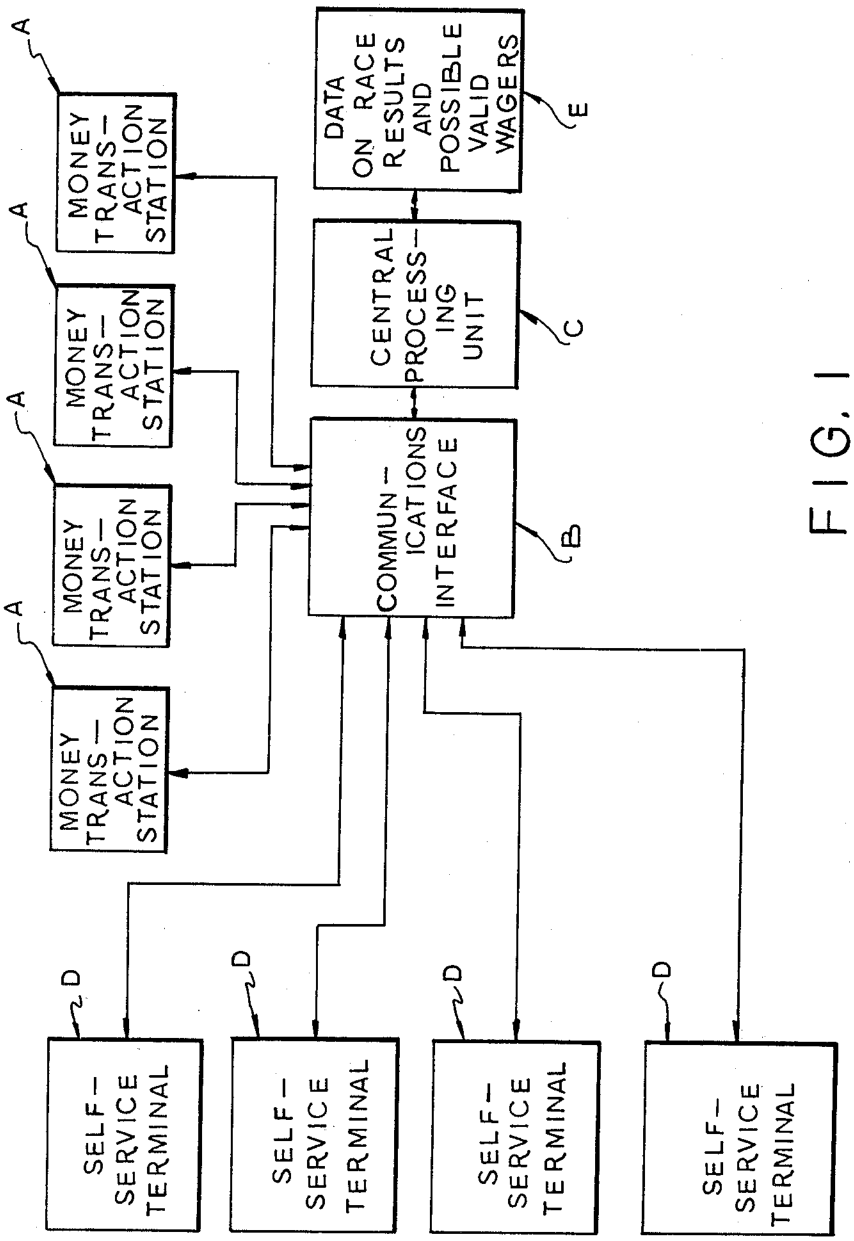
FIG. 1 is a block diagram showing the relationship between the central processing unit, the money collection and pay windows and the self-service wagering terminals of the present invention.

FIG. 1 shows, in block diagram form, the relative locations and general function of the components of the self-service wagering system of the present invention. The system includes a plurality of money transaction stations, generally designated A, which are preferably situated at one or more convenient locations at the race track, such as at the entrances or exits thereof. At each of the money transaction stations A, one or more agents are located, each of which is provided with a ticket issuing machine with a keyboard type input, as well as a ticket reading mechanism similar to those described below.

A bettor, upon entering the track, determines the amount of money which he wishes to wager and then deposits the money with the agent, who will enter this amount on his keyboard. When the transaction is accepted by the central processing unit, the bettor is issued a ticket which has a unique machine-readable identification code thereon, as well as an acknowledgment of the credit balance for the ticket transaction to which the identification code corresponds, the credit balance being equal to the amount deposited. The issued ticket also has a form upon which the bettor can mark information concerning his first wager. The ticket acts as the bettor's receipt for his deposit.

Each of the money transaction stations A is connected, by means of a cable or the like, to data processing equipment situated at a central location. The data processing equipment includes a communications interface, generally designated B, and a central processing unit, generally designated C. Communications interface B has a number of input/output terminals, each one of which is connected to one of the money transaction stations A, or to one of the self-service terminals, generally designated D, the purpose of which is described below. The communications interface polls each of its input/output terminals in sequence, in a conventional manner, to determine if there is any data to be received therefrom. Each of the input/output terminals of interface B is thus sequentially connected to the input/output of central processing unit C for a time during which data may flow between the remote station A or terminal D on the one hand, and the central processing unit C, on the other hand. The structure of communications interface B is conventional and known in the art as it is identical to the interfaces of this type which are commonly employed in conjunction with conventional computer equipment designed for use on a communications basis.

When a deposit is made at one of the money transaction stations A, the money transaction station A is connected to the central processing unit C through communications interface B, data is transmitted to the central processing unit C which assigns a ticket transaction identification code for the transaction, records the transaction and authorizes a ticket to be printed and issued. The ticket transaction identification code corresponds to a data storage area in the transaction record memory where the transaction is recorded. The amount of the deposit is stored in the area of the memory which corresponds to the identification code.

Each ticket transaction is given a unique transaction record identification code. This code will serve to identify the ticket transaction until such time as the transaction is closed out, either because the entire credit balance has been bet and lost, or the bettor uses the ticket for a new transaction.

Payment can be demanded at any time by returning a ticket with the proper identification code to the agent at one of the money transaction stations A. The agent inserts the ticket into a ticket reading machine located at the station which reads the ticket identification code, transfers same through interface B to central processing unit C which will then locate the ticket transaction record memory area corresponding to the identification code and notify the agent at station A the credit balance for that ticket. The agent then pays the bettor the amount indicated and the central processing unit deducts the paid amount from the credit balance leaving a zero credit balance, causing the transaction to be closed out.

A bettor can also present a ticket and cash to increase his credit balance or cash a ticket with a large credit balance and receive cash and a ticket with a smaller credit balance. The bettor, therefore, can alter the credit balance at any time.

Since central processing unit C will automatically calculate the payment for each winning wager, it is necessary that the central processing unit contain therein information concerning the results of previously completed races, as well as information concerning possible valid wagers on upcoming races. This information is entered into the memory banks of central processing unit C by an external terminal, generally designated E. Information concerning the horses which won the previous races, as well as information concerning possible valid wagers on upcoming races, for example, the opening of the race and betting pool, the scratching of runners, acceptable betting amounts, etc., may be entered into central processing unit C by means of a keyboard-type terminal, or may be automatically entered therein from the output of a separate data processor connected to input E.

Figure 2:
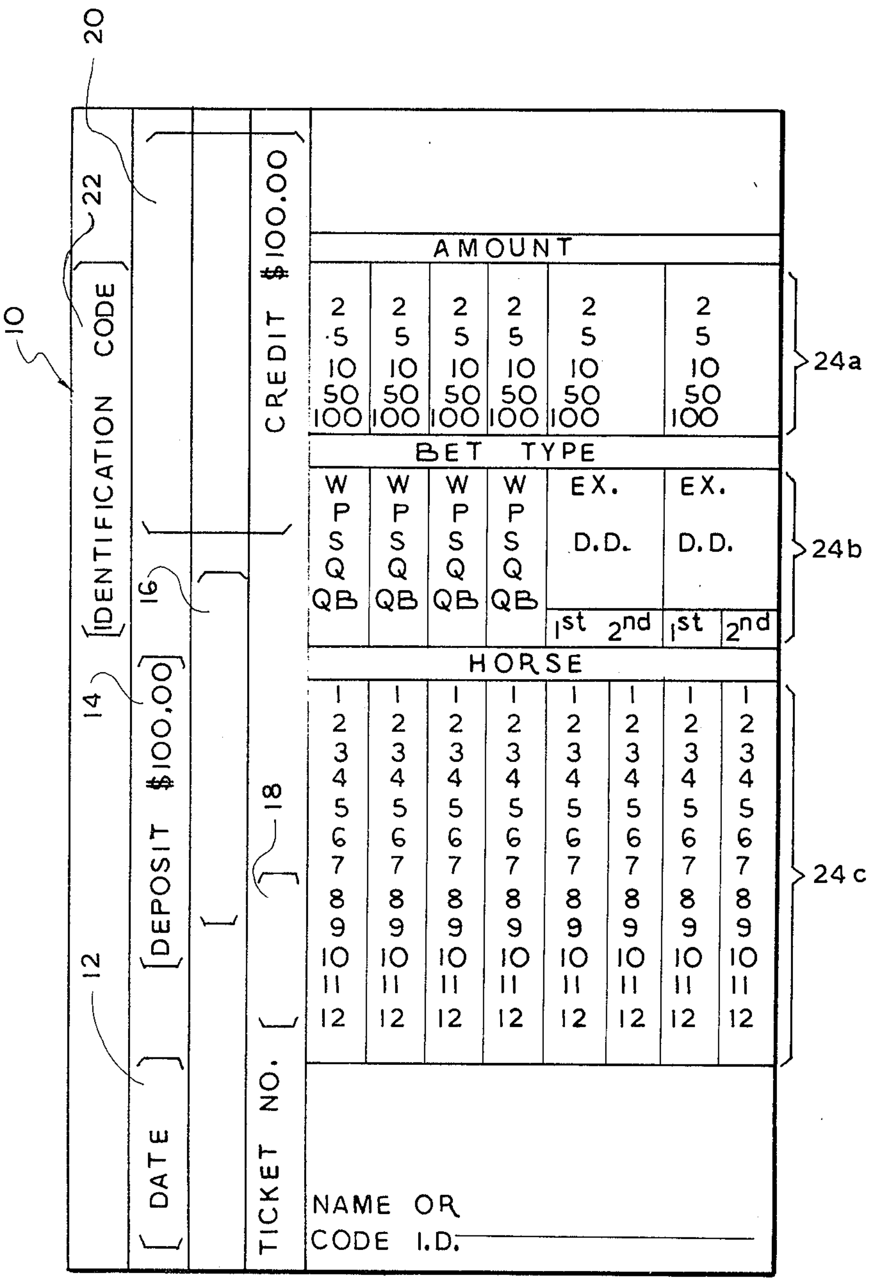
FIG. 2 is a reproduction of a ticket which has thereon an acknowledgment of a deposit.

A typical ticket issued by the agent at a money transaction station A upon a deposit of, for example, $100, appears as shown in FIG. 2. The ticket, generally designated by the numeral 10, has a space 12 for the date of issuance and a space 14 upon which the amount of the deposit, in this case $100, is recorded. The adjacent column, designated 16, is blank in this instance, but will provide space upon which information concerning an outstanding wager will be imprinted. For instance, in space 16 will be imprinted the amount of the bet, whether the bet is for "Win", "Place" or "Show", the number of the race and the number of the horse.

The next column has a space 18 for the number of the ticket. A space 20 is provided for the updated credit balance, in this case, the amount of the deposit. A section 22 is provided for imprinting a machine-readable ticket transaction identification code. Another section 24 contains a form upon which the bettor may enter one or more proposed wagers. Space 24 has a first portion 24*a* in which the amount of the bet may be entered ($2, $5, $10, $50, $100); a second section 24*b* in which the type of the bet may be entered ("Win", "Place", "Show", "Quinella", "Quinella Box", "Exacta", and "Daily Double"); and a third section 24*c* where the number of the horse may be entered.

Figure 3:
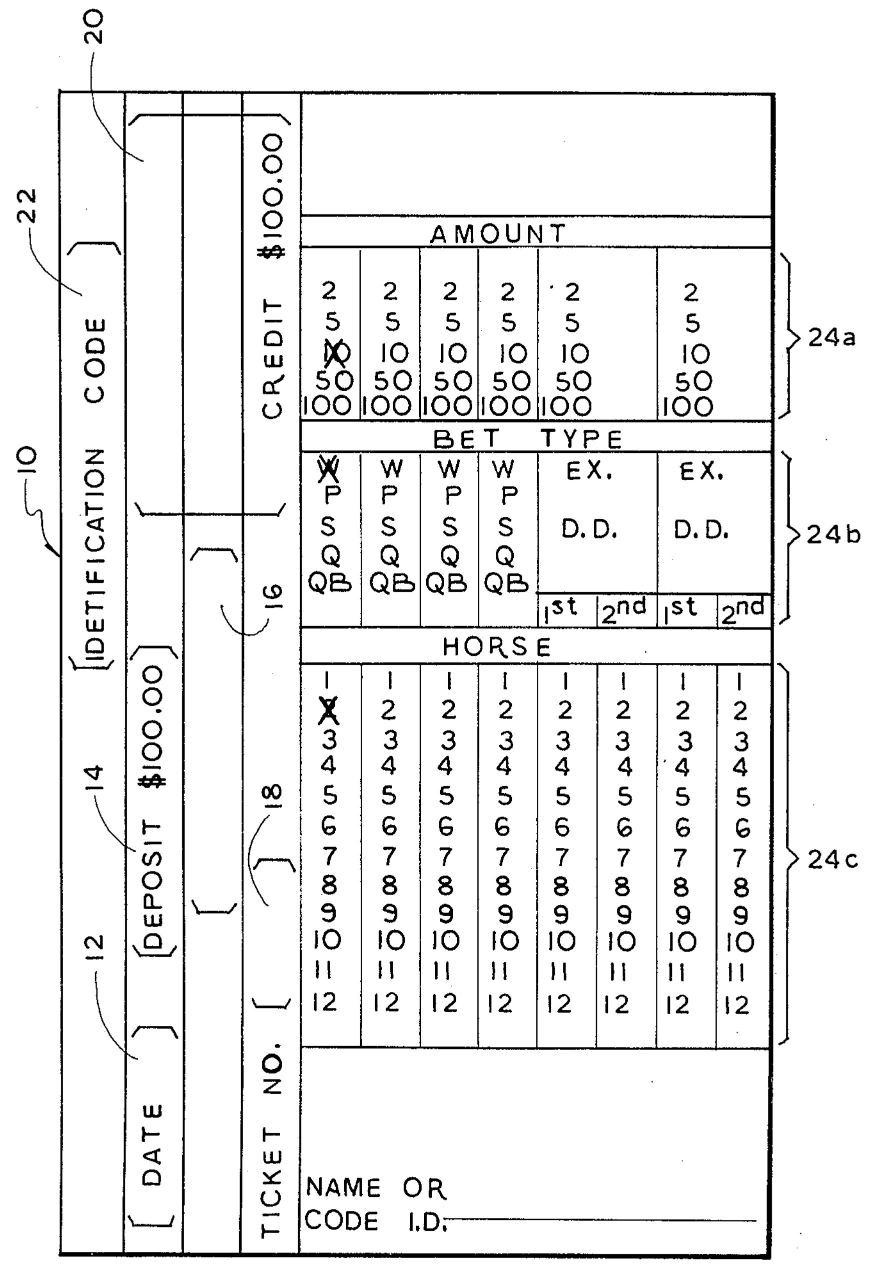
FIG. 3 is a reproduction of a ticket shown in FIG. 1, marked for a proposed wager.
Figure 4:
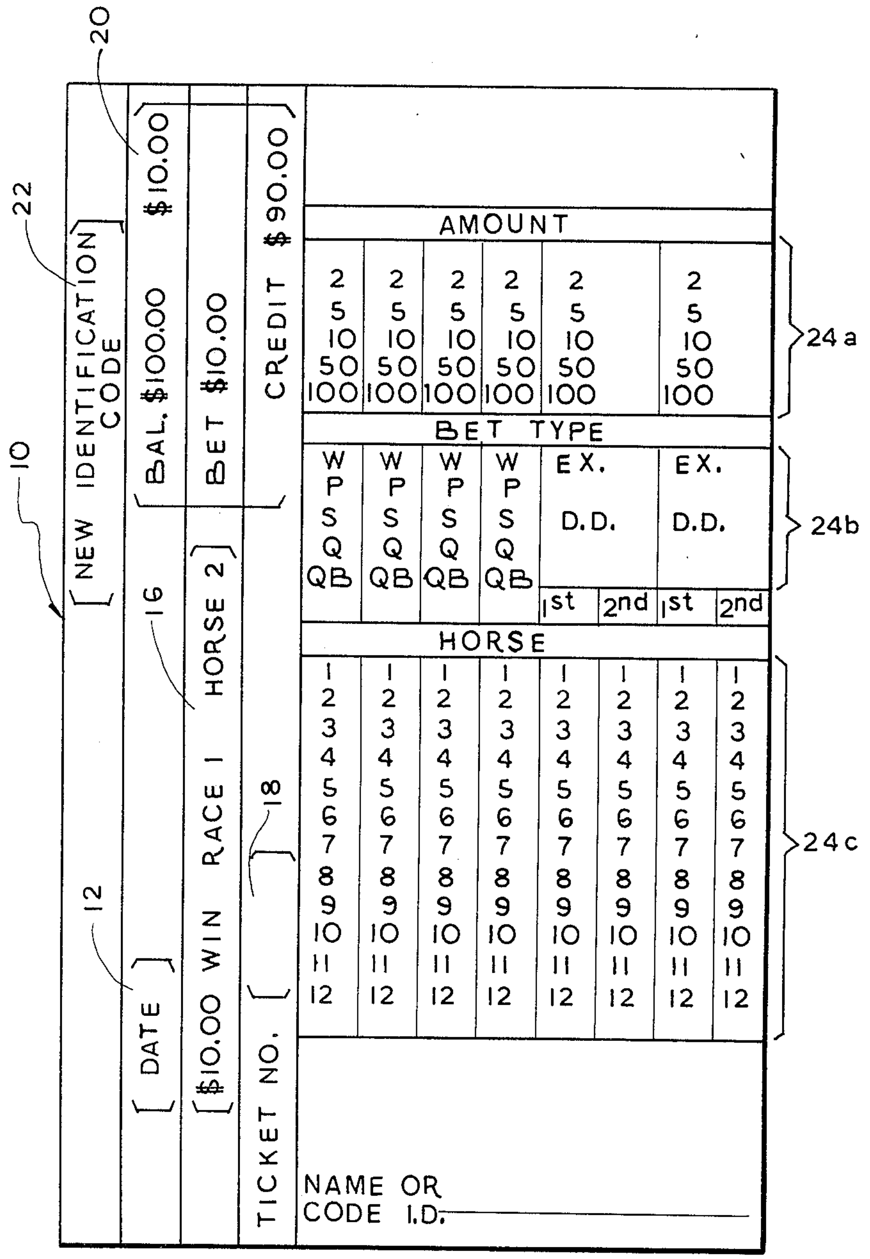
FIG. 4 is a reproduction of a ticket having an acknowledgment of an outstanding wager previously entered on the ticket shown in FIG. 3, an acknowledgment of the updated credit balance, and a form upon which a new wager may be entered.

In order to place a bet, the bettor first marks section 24 of ticket 10, as shown in FIG. 3, by placing a mark on the sections corresponding to the amount, bet type and horse of the proposed wager. In this case, the proposed wager is in the amount of $10 placed on horse #2 to "Win" in the First race. The bettor goes to any of the self-service terminals D, situated at convenient locations around the track, and inserts his ticket, marked as shown in FIG. 3, into the entrance port. Assuming that the credit amount is sufficient to cover the bet and that the proposed wager is valid in all respects (that is, the horse has not been scratched, the amount is within the acceptable limits, etc.), the terminal will retain the inserted ticket and issue a new ticket 10', as shown in FIG. 4.

Ticket 10' has a (new) unique ticket transaction identification code, indicating that the transaction acknowledged thereby relates to a new ticket transaction (the record for ticket 10 is marked as completed). Ticket 10' has in space 16 printed thereon an acknowledgment of the outstanding wager which, in this example, is in the amount of $10 for horse #2 to "Win" the First race. It shows that from a balance of $100 the bet of $10 has been deducted, leaving an updated credit balance of $90, as noted in space 20. Ticket 10' also has a new form at column 24 to permit the bettor to mark his proposed wager for a subsequent race.

Figure 5:
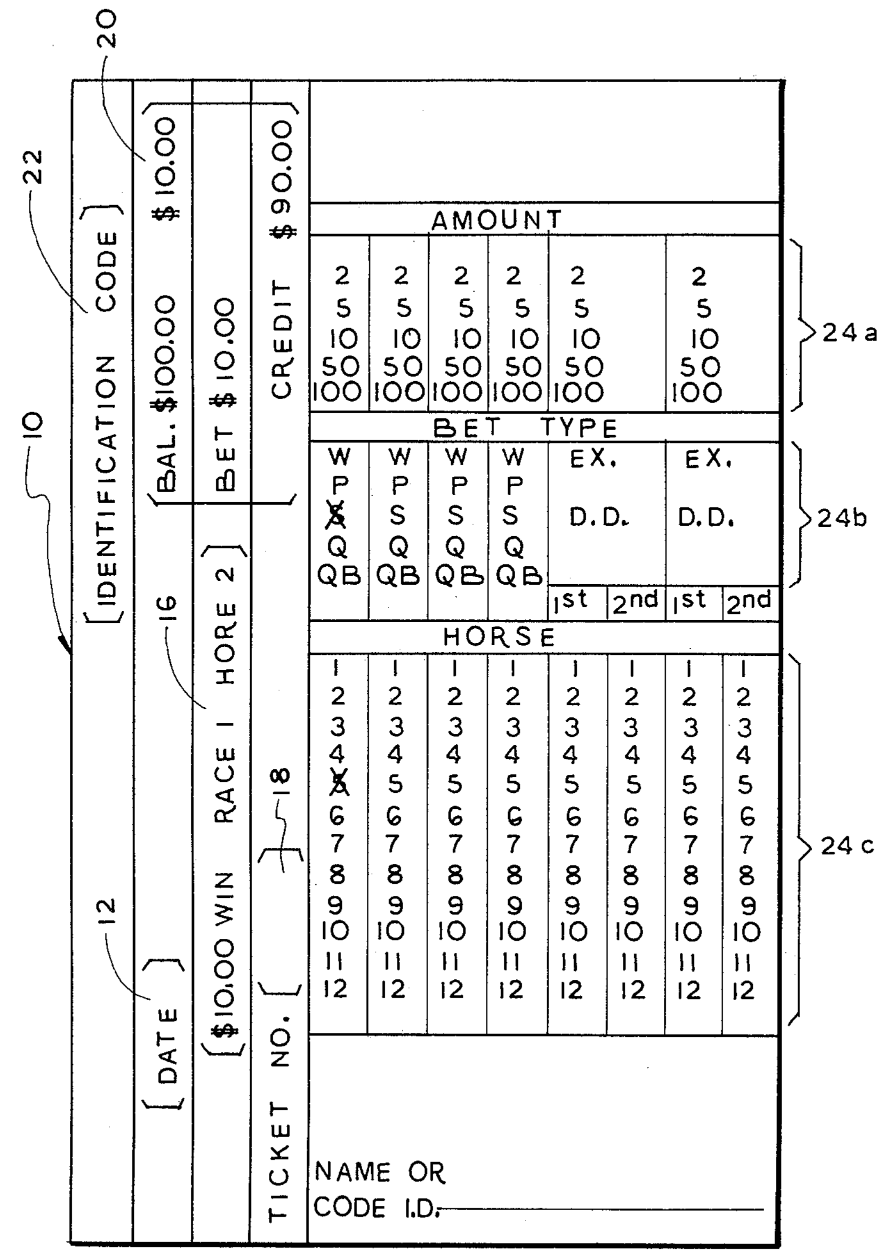
FIG. 5 is a reproduction of the ticket shown in FIG. 4, marked with a new proposed wager.

After the first race has been completed, the bettor will mark ticket 10' with the information concerning his proposed wager on the Second race, as shown in FIG. 5. In this case, it is a $50 "Show" bet for horse #5 in the next race (race 2). Prior to the Second race, the ticket 10' is inserted into one of the self-service terminals D. The wagering system will then compare the outstanding wager with respect to the First race with the results of the First race and, if same coincide, indicating a winner, will add the winning amount to the credit balance. The system will also determine if the proposed wager with respect to the Second race is acceptable and, if so, will record same, deduct the amount thereof from the credit balance and assign a unique ticket transaction record number. All this information will be printed on a new ticket, having a new ticket transaction identification code number and a new form upon which the proposed wager information concerning the Third race can be entered.

In this manner, money handling is greatly reduced and only a single transaction is required each time an outstanding wager is collected upon, a new wager is placed and the credit balance for the account is updated. The bettor normally will have only a single ticket in his possession at any one time. This ticket will have noted thereon the bettor's current credit balance and any outstanding wager which has not as yet been collected upon.

After all the races have been completed, or the bettor no longer wishes to place any wagers, the bettor has the option of being paid an amount equal to the credit balance and his unpaid winning wagers, by simply presenting his ticket at the money transaction station A, or, alternatively, he may retain the ticket as a receipt for the amount of his credit balance and use same at a future date, at which time he enters the track, marks his bet on the ticket and inserts same into the self-service terminal D which will automatically locate the information concerning his last ticket transaction, even though that transaction occurred several days or weeks previously. It is therefore theoretically possible for a particular bettor to make a single deposit at the beginning of a racing season and, as long as he always has a balance, never have any additional money transactions until his balance is depleted, either by losing his bets or by withdrawing his money.

Figure 6:
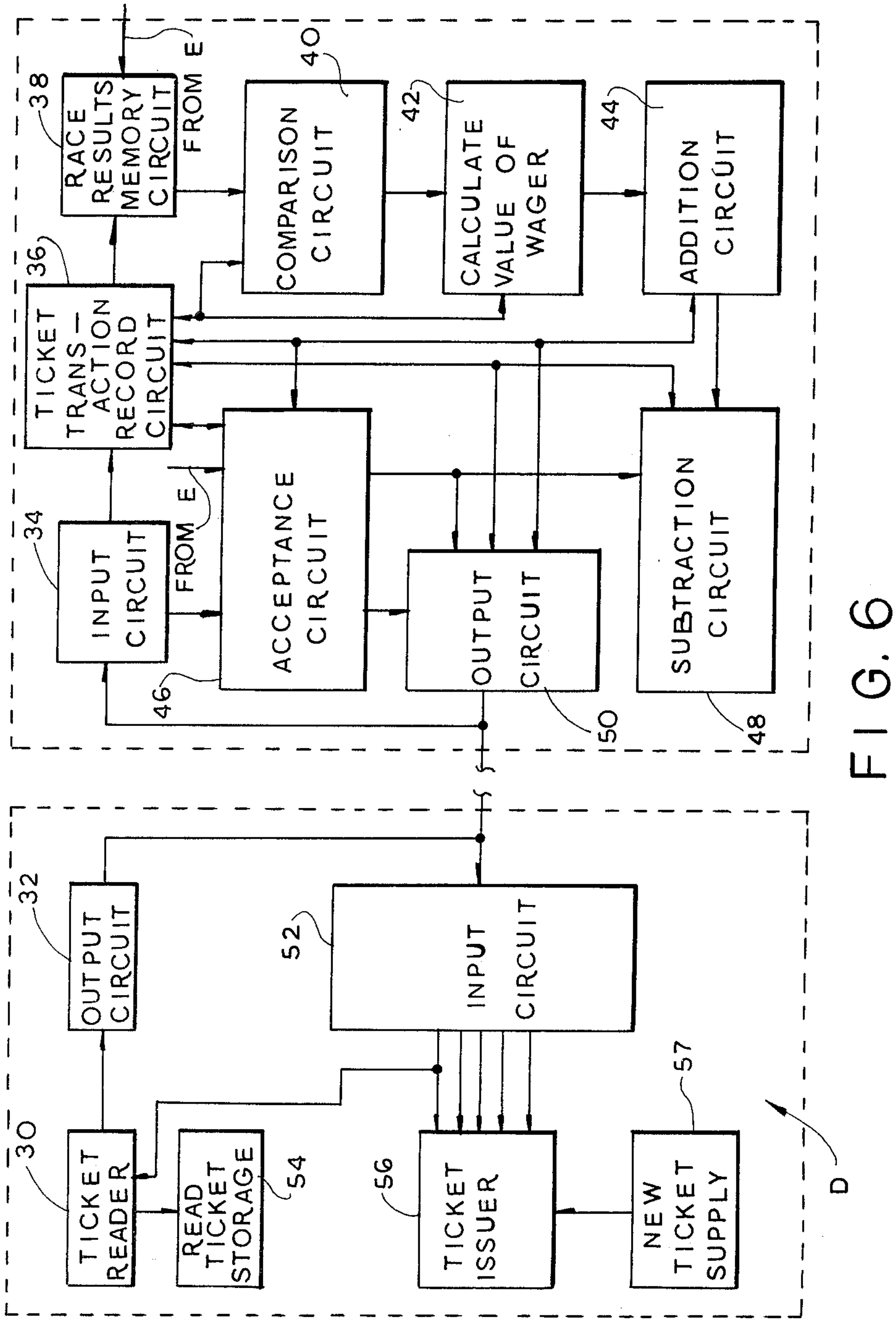
FIG. 6 is a more detailed block diagram of a wagering terminal and the central processing unit.

FIG. 6 is a block diagram of central processing unit C and a typical self-service terminal D. In this diagram and for purposes of the explanation relating to the function of the present invention, the function of the communications interface B will not be considered, it being understood that the communications interface B is a conventional component which merely polls the terminals in sequence, as described above. Thus, the present invention will be described as if the central processing unit C were functioning in conjunction with a single self-service terminal D. The functioning of the system with multiple remote terminals will be readily apparent to those skilled in the art from this explanation.

When a ticket is inserted into a self-service terminal D, it is conveyed to a ticket reader 30 which scans space 22 thereon to read the machine recognizable ticket transaction identification code and space 24 to read information concerning the proposed wager. Assuming this information to be in proper form, the ticket is held in escrow and the read information is transferred to an output circuit 32 wherein the read information is coded and prepared for transmission to the central processing unit C. This information is temporarily stored in output circuit 32 until interface B indicates that the central processing unit C is available to receive same. Output circuit 32 encodes the read data, converting same into a digital word which will typically consist of two portions, the first portion being a digital number representing the ticket transaction identification code, and the second portion being a digital number representing the information concerning the proposed wager. Output circuit 32 is a conventional circuit of the type which is commonly used to convert electronic signals from one form to another. The encoded information is stored in a temporary storage location such as a random access memory. At the appropriate time, the information in storage is transmitted to the central processing unit C.

The central processing unit receives the transmitted data at input circuit 34 which separates the transmitted data to its component portions, the first portion of which is a digital number representing the ticket transaction record identification code, and the second portion of which is a digital number representing the proposed wager information. The digital number representing the ticket transaction record identification code is transferred to a ticket transaction record memory circuit 36 wherein the identification code information is used to address the location in the memory corresponding to the ticket transaction record information wherein previously entered outstanding wager information and credit balance information is retained for the ticket transaction designated.

One of the bits of information contained in the memory is the number of the race to which the stored outstanding wager information relates. This information is transmitted to a race results memory 38, wherein it is used to address the location where is stored information concerning the winners and the winning payout amounts for each of the previously completed races. The information concerning the outstanding wager from memory 36 and the information concerning the race results of the race to which the outstanding wager pertains, from memory 38, are both transmitted to a comparison circuit 40. Comparator 40 compares this information to determine if same coincides, that is, whether the proposed wager information matches the race results, indicating that the bettor has won his outstanding wager. If comparator 40 determines that the information coincides, a calculation circuit 42 calculates the value of the outstanding wager, in accordance with the winning payout amount, and then transfers this information to an addition circuit 44 which adds the output of calculation circuit 42 to the credit balance obtained from accessing the transaction memory, to provide an altered balance. Transaction memory 36 is notified by circuit 44 that payment for the winning bet has been credited.

The second portion of the signal decoded by input circuit 34, which pertains to the proposed wager information, is transmitted to acceptance circuit 46. This information is compared to information concerning possible valid wagers for the race to which the proposed wager pertains. If this information coincides, the amount of the proposed wager is compared to the calculated altered balance from circuit 44, to determine if there are sufficient funds to cover the proposed wager. If the amount of the altered balance is greater than or equal to the amount of the proposed wager, circuit 46 causes a subtraction circuit 48 to subtract the amount of the now accepted wager from the amount of the altered balance, to form the updated balance. A new transaction record identification code is generated for the newly accepted wager. A signal signifying the acceptance of the proposed wager is transmitted to output circuit 50. In addition, the altered balance information from circuit 44 and the updated balance information from circuit 48, the accepted wager information from circuit 46, as well as the new ticket transaction identification code, are conveyed to output circuit 50.

Further, updated balance and accepted wager information, along with the new transaction identification code corresponding thereto, are transferred to the ticket transaction record memory 36 and recorded in the assigned location, such that the information in the memory 36 is accordingly updated for the latest ticket transaction. Thus, the memory 36 notes the payment of the outstanding wager and closes out the record relating thereto, unless the proposed wager has been rejected. If the proposed wager has been rejected, the read ticket is returned to the bettor, payment is not made or noted, the record is not closed out and no new record is opened. If no proposed wager has been entered on the ticket, the system operates as if an accepted wager were present, except no accepted wager information is recorded. In this case, the updated balance is equal to the altered balance, there being no deduction for a new wager.

Output circuit 50 serves to serially encode all of the information received therein. This is typically done by forming a single digital signal having five portions, each portion representing a different item of information. Thus, for instance, one portion of the signal may relate to the ticket transaction identification code, another to the altered balance, still another to the updated balance, the fourth to the information concerning the accepted wager, and a fifth an indication that the wager has been accepted (or rejected). This information is transferred to the appropriate self-service terminal D, wherein it is received by an input circuit 52. Input circuit 52 receives the transmitted information from output circuit 50 of central processing unit C and divides the signal into its component portions for use in terminal D.

At this point in the operation of the terminal, the ticket is being held in escrow in the ticket reader 30. If the proposed wager has been accepted by the central processing unit C, a signal representing the acceptance of same has been received by input circuit 52 and is transmitted to the reader 30. In the presence of this signal, the ticket reader 30 will release the ticket being held in escrow and convey same to a storage facility 54 wherein the ticket will be retained.

The same acceptance signal from input circuit 52 is sent, along with the decoded signals representing the transaction identification code, the altered balance, the updated balance and the accepted wager information, to a ticket issuing station 56 which will obtain a new ticket from a ticket supply 57 and forward same to a ticket printer wherein the ticket will be imprinted with the transaction identification code, altered balance information, updated balance information and an acknowledgment of the accepted wager. As the ticket is being printed, same is being conveyed to an exit port in the terminal to be extracted by the bettor.

In the event that the proposed wager has not been accepted, the transaction memory 36 will not close out the previous transaction, and the signal received by input circuit 52 from central processing unit C will not have a signal which represents the acceptance of the proposed wager, but instead will have a rejection signal. The rejection signal will be generated to the ticket reader 30 which will cause the ticket to be returned to the entrance port and an error message will be displayed. It is for this reason that the ticket is held in escrow in the ticket reader, instead of being conveyed to the storage location 54, until either an acceptance signal or a rejection signal is received by the terminal. In the event that the proposed wager is not accepted, the ticket will be returned to the bettor and no new ticket will be issued. The rejection signal is routed to an error message generator circuit which actuates the display panel on the terminal D to indicate to the bettor that the proposed wager is unacceptable because it does not coincide with the valid wagers for the race to which it pertains or for insufficient funds.

Figure 7A:
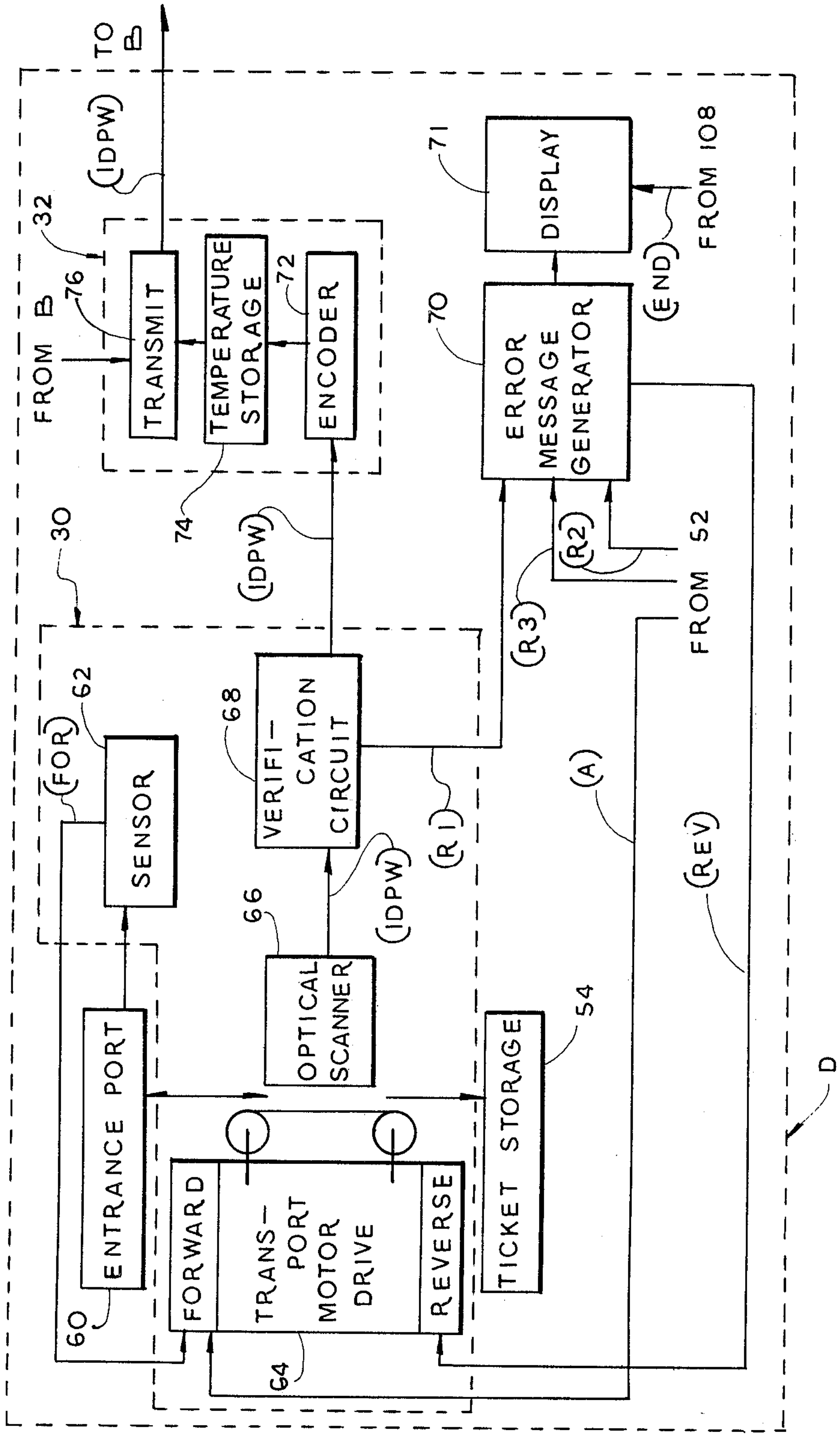
FIGS. 7A and 7B are still more detailed block diagrams of the self-service wagering terminal of the present invention.
Figure 9:
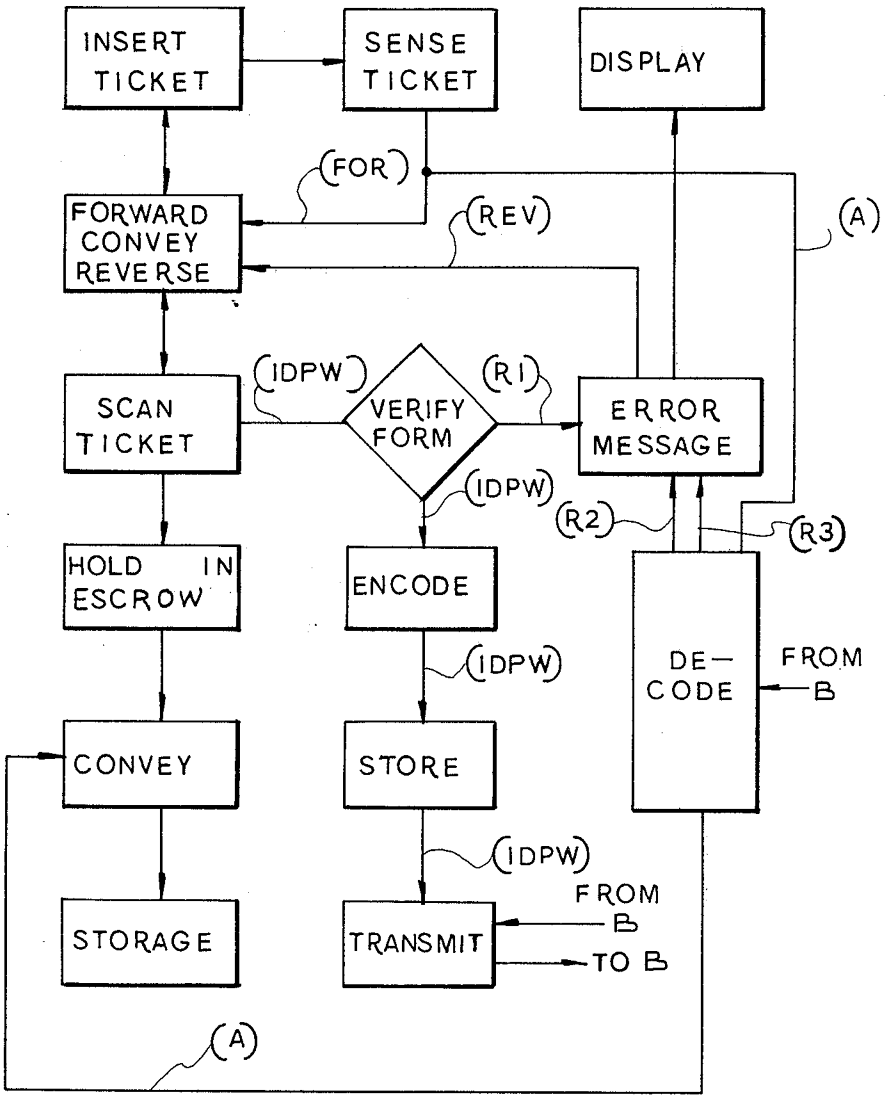
FIG. 9 is a flow diagram of the document read operations which take place at the remote wagering terminals of the first preferred embodiment of the present invention.

FIG. 7A is a more detailed block diagram of the self-service terminal D. FIG. 9 is a flow diagram of the operations which the terminal shown in FIG. 7A will undergo during the ticket reading procedure.

Self-service terminal D is provided with an entrance port or slot 60 wherein the bettor inserts his ticket. A sensing circuit 62 senses the presence of the ticket in the entrance port and generates a signal (FOR) to actuate a transport motor 64 to transfer the ticket from the entrance port 60 to the optical scanner 66, which scans the ticket to read the transaction record identification code from space 22 and proposed wager information from space 24. Optical scanner 66 may be identical in structure to those commercially available in AmTote TRV 280, TIM 350 and TIM 360 systems from American Totalisator Systems, Inc., Hunt Valley, Md. The read information (designated as IDPW) is transferred to a verification circuit 68 which verifies that the form of the transaction record identification code is proper.

If the verification circuit 68 determines that the form of the sensed transaction identification code is improper, for example, has an inappropriate number of digits or the like, verification circuit 68 generates a reject signal (R1) to an error message generator 70 which, in turn, generates a signal (REV), causing transport motor 64 to reverse its direction and convey the ticket from scanner 66 back to entrance port 60. Error message generator 70 will provide the necessary input to a display 71, composed of light emitting diodes or other similar devices, on the face of the terminal to display an error message which tells the ticket holder that his ticket has been rejected because of an improper transaction record identification code.

If verification of the form of the transaction record identification code is obtained from circuit 68, the sensed information (IDPW) from scanner 66 is transferred to output circuit 32. Output circuit 32 consists of an encoding circuit 72 wherein the sensed information from scanner 66 is converted into digital form, preferably in the form of a digital word (IDPW) having two portions, one of which contains the transaction record identification code (ID) and the other of which contains the information concerning the proposed wager (PW), such as the number of the horse, the amount of the bet, the type of bet, etc. The encoded information is then transferred to a temporary storage circuit 74 which may be in the form of a random access memory. The information is stored in storage circuit 74 until it is transferred to the central processing unit C. When central processing unit C is prepared to receive the information from the self-service terminal D in question, a transmission circuit 76, which may simply be a gate or the like, is closed by a signal from interface B as temporary storage circuit 74 is caused to read out the information contained therein, such that the encoded information (IDPW) is transferred to the central processing unit C.

Figure 8A:
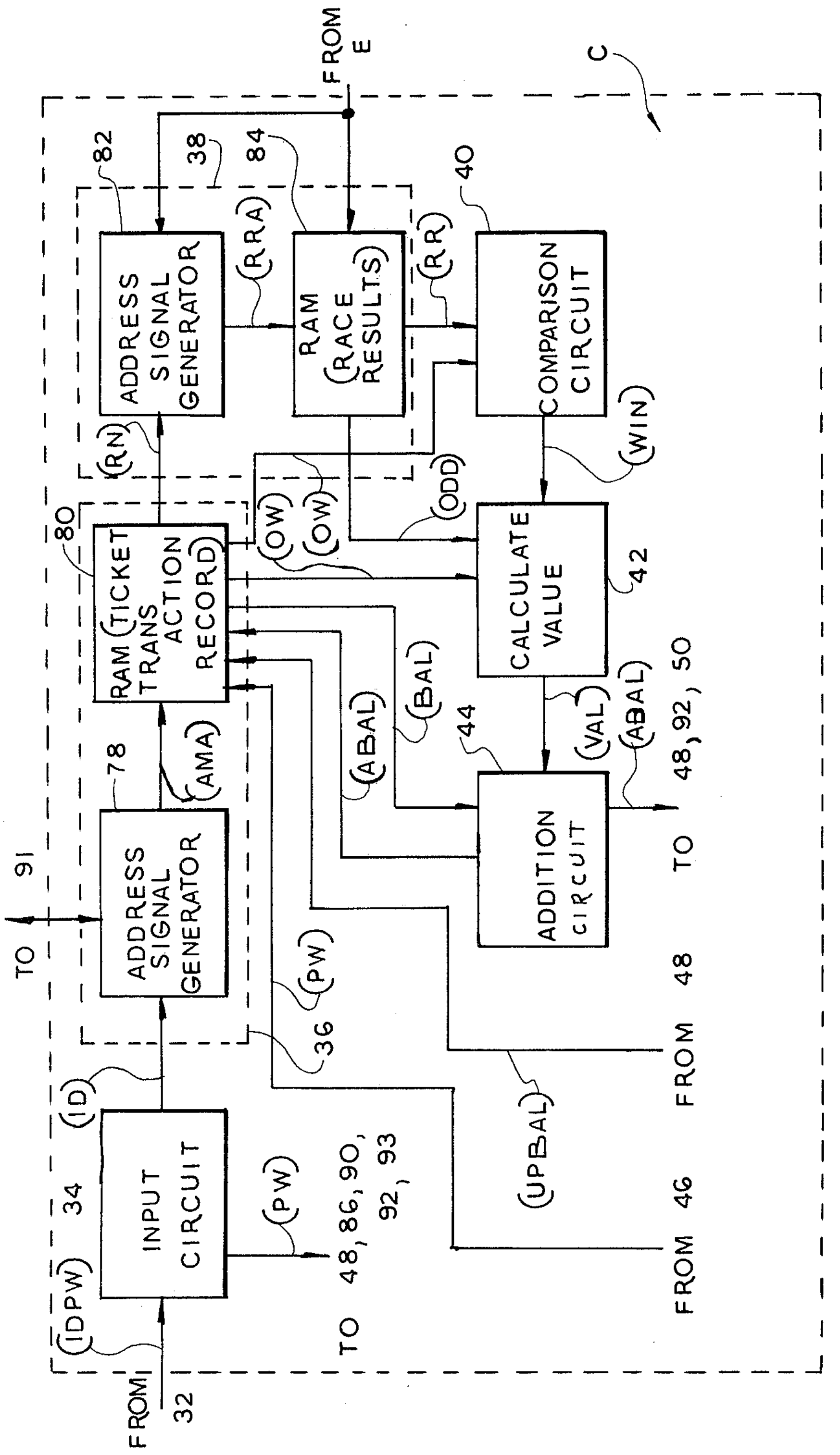
FIGS. 8A and 8B are still more detailed block diagrams of the central processing unit of the first preferred embodiment of the present invention.
Figure 10:
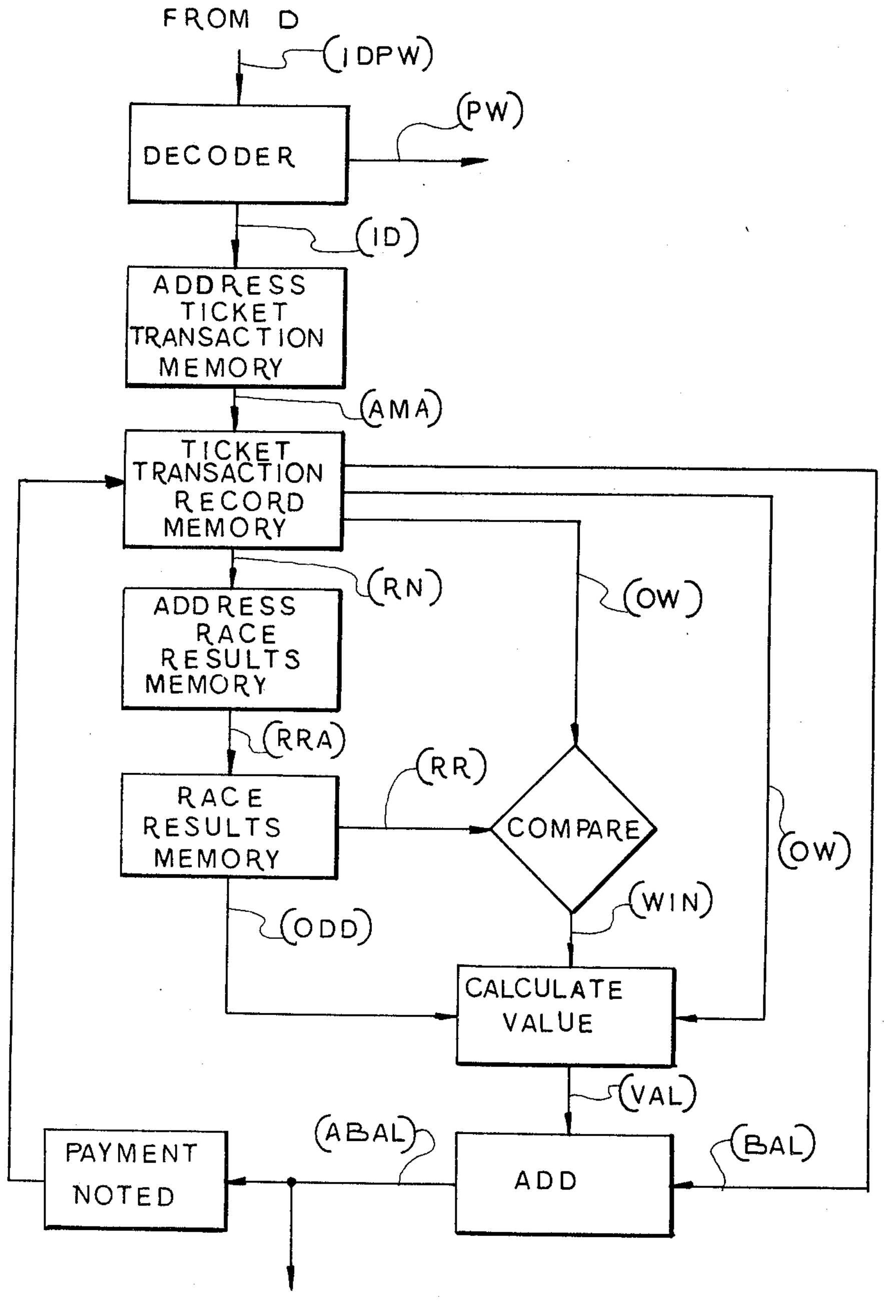
FIG. 10 is a flow diagram of an outstanding wager payment operation which takes place at the central processing unit of the first preferred embodiment of the present invention.

Referring now to FIG. 8A which is a detailed block diagram of the central processing unit C, and FIG. 10, which is a flow diagram of the operations of the central processing unit relating to the outstanding wager transaction, the signals (IDPW) transmitted by output circuit 32 are received in the central processing unit C by an input circuit 34. Input circuit 34 decodes the incoming signal and separates it into its component parts, that is, the portion (ID) which relates to the transaction record identification code and the portion (PW) which relates to the information concerning the proposed wager.

The portion of the received signal which relates to the transaction record identification (ID) is transferred to transaction record memory circuit 36 which comprises an address signal generator 78 and a random access memory 80 containing the stored transaction record information.

The signals (ID) representing the transaction record code which are received at the input of address signal generator 78 are converted into signals (AMA) which are appropriate for addressing the location in random access memory 80 which corresponds to the transaction record code read from the ticket. The output of address signal generator 78 (AMA) is then applied to the address input of random access memory 80. Random access memory 80 has stored therein information concerning the credit balance and outstanding wager for each transaction. A different area of the memory or storage location, corresponding to a unique transaction record code, is set aside in the random access memory to store this information for each transaction.

Assuming that the location accessed in the random access memory 80 contains information concerning an outstanding wager which has not been paid, this information will include the number of the race to which the outstanding wager pertains. This information (RN) is transferred to a race results memory circuit 38 which comprises an address signal generator 82 which will convert the stored information relating to the race to which the outstanding wager pertains into an address signal (RRA). The address signal (RRA) formulated by address signal generator 82 is transferred to a random access memory 84 which contains the results of previously run races. The information in random access memory 84 is updated after each race with the results thereof by programming same through an external input E (not shown). Random access memory 84 will then read out the race results (RR) of the race to which the outstanding wager pertains. This information is transferred to a comparison circuit 40 and includes the numbers of the horses which won, placed and showed in the race. The other input comparison circuit 40 will be the stored information (OW) from the random access memory 80 which indicates the horse selected in the outstanding wager and whether same was bet on to "Win", "Place", "Show" or "Feature". Comparison circuit 40 compares the outstanding wager information (OW) from the transaction record memory 80 and the race results information (RR) from the race results memory 84 and, if same coincide, indicating that the ticket holder was a winner, comparison circuit 40 generates a signal (WIN) to calculation circuit 42 indicating that a payout is required.

Calculation circuit 42 calculates the value of the outstanding wager. The inputs to calculation circuit 42 consist of information concerning the amount of the outstanding wager and the type of wager ("Win", "Place", or "Show") (OW) from the transaction record memory and the payout amounts (ODD) for each of the winning horses, from random access memory 84, which contains the race results. Circuit 42 calculates the value of the winning wager, based on the input information, by multiplying the amount of the winning bet times the unit pay amount to form a signal (VAL) representative of the required payoff.

The output of calculation circuit 42 (VAL) is transferred to an addition circuit 44 which calculates the ticket holder's altered balance. Circuit 44 receives information concerning the ticket holder's current balance (BAL) from random access memory 80 and adds same to the input (VAL) from calculation circuit 42, which represents the amount of the payoff, such that an altered balance (ABAL) is formed which equals the previous balance plus the payment for the winning wager. The output of circuit 44 (ABAL) is transferred to memory 80 which notes payment of the outstanding wager. If the wager was lost, the value thereof (VAL) will be zero and the altered balance (ABAL) will equal the previous balance (BAL). Thus, receipt of the altered balance signal (ABAL) by memory 80 causes same to mark the outstanding wager paid.

Previous day transactions may be handled differently from current transactions. At the end of a day, an offline processing run may be used to clear out all losing transactions with a zero balance and, if required, overaged transaction records with a balance which has not been withdrawn. Moreover, the system may also compute the value and credit each outstanding winning wager. This information is then stored in a "previous day" memory section.

Figure 8B:
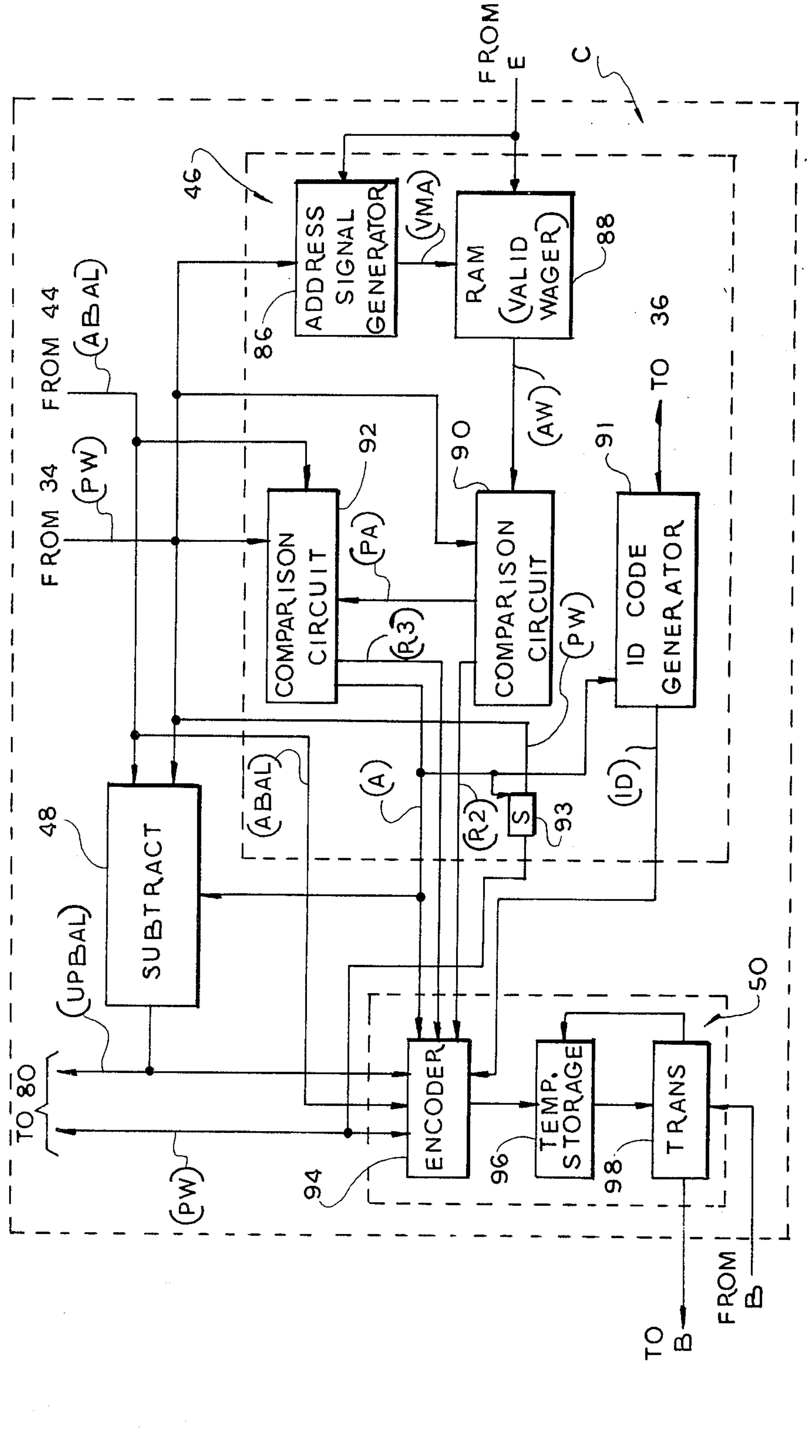
Figure 11:
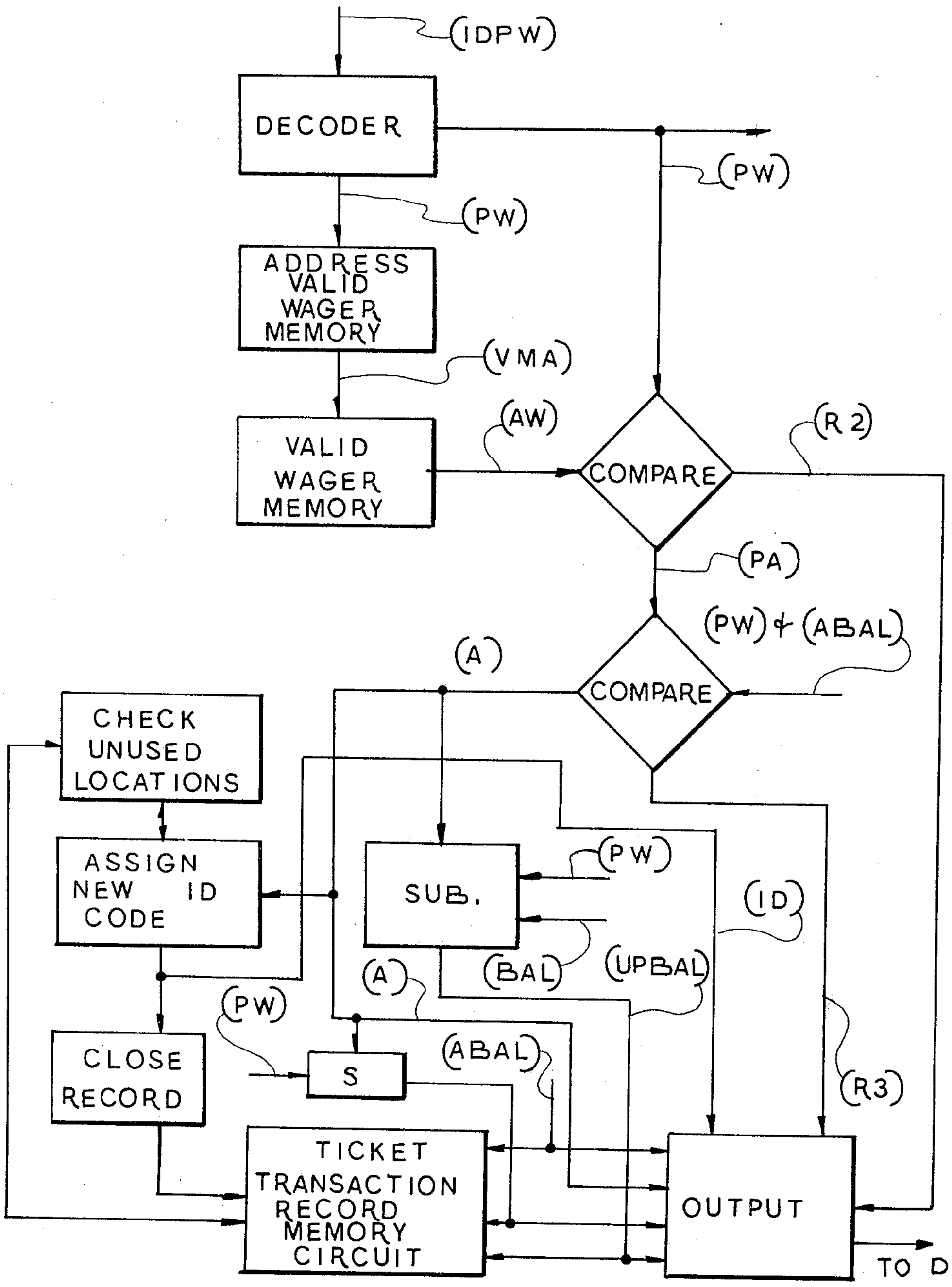
FIG. 11 is a flow diagram of a proposed wager acceptance operation which takes place at the central processing unit of the first preferred embodiment of the present invention.

Referring now to FIG. 11, which is a flow chart of the operations of the central processing unit relating to a proposed wager transaction and to FIG. 8B, the output of input circuit 34 which contains the information (PW) concerning a proposed wager (the amount of the bet, the number of the horse, and the type of bet) is transferred to an acceptance circuit 46 which consists, in part of an address signal generator 86 and a random access memory 88 which contains information concerning possible valid wagers on upcoming races.

A portion of the information (PW) concerning the proposed wager from input circuit 34 contains information concerning the number of the race to which the proposed wager pertains. This information is converted in address signal generator 86 into an address signal (VMA) which will address the location in random access memory 88 which contains information concerning valid wagers for the pertinent race. The information in random access memory 88 concerning the possible valid wagers for each of the upcoming races is entered into random access memory 88 by an external input E (not shown). This information indicates which horses have been scratched from the race, the limits for acceptable bets, etc.

The output (AW) from the accessed location in random access memory 88 is transferred to a comparison circuit 90 which also receives the information (PW) from input circuit 34 which pertains to the proposed wager, that is, the horse upon which the bet is placed, the amount of the bet and the type of bet. Comparison circuit 90 compares the possible valid wager information (AW) from random access memory 88 with the proposed wager information (PW) to determine if same coincide, indicating that the proposed wager is provisionally acceptable. If coincidence is found, a provisional acceptance signal (PA) is generated. If not, a rejection for invalid wager signal (R2) is generated.

One of the outputs (PA) from comparison circuit 90, indicating a provisionally acceptable wager, is transferred to a comparison circuit 92 which receives the altered balance information (ABAL) from calculation circuit 44 and information (PW) concerning the amount of the proposed wager, from input circuit 34 and compares same when the provisional acceptance signal (PA) is received. If the altered balance is greater than or equal to the amount of the proposed wager, the wager is accepted and an acceptance signal (A) is generated. However, if the amount of the wager is greater than the altered balance, the wager is rejected for insufficient funds and a rejection signal (R3) is generated by comparison circuit 92. If the proposed wager is accepted, the acceptance signal (A) is transferred to subtraction circuit 48 which subtracts the value of the now accepted wager contained in signal (PW) from circuit 34, from the altered balance (ABAL) from circuit 44 to formulate the updated balance (UPBAL). The updated balance (UPBAL) is transferred to memory 80 and output circuit 50. If the proposed wager is rejected or does not exist, no acceptance signal (A) is generated, no amount is subtracted, and the updated balance (UPBAL) equals the altered balance (ABAL).

Moreover, the acceptance of the wager is noted by identification code generator 91 which receives the acceptance signal (A) and assigns a unique identification code (after accessing the transaction record memory circuit 34 to determine which storage locations are available) corresponding to the transaction record for the accepted wager. This new identification code is transferred to memory circuit 36, causing the previous transaction to be closed out, and determines the location in memory 80 where the new transaction record information will be stored.

The acceptance signal (A) is also applied to an electronically controlled switch 93, which is closed so as to transfer the now accepted wager information (PW) from circuit 34 to memory 80 and output circuit 50. In addition, the reject for insufficient funds signal (R3) from comparison circuit 92, the rejection for non-valid wager signal (R2) from comparison circuit 90, and the transaction record identification code (ID) from code generator 91, the altered balance (ABAL) signal from circuit 44 and the acceptance signal (A) from circuit 92 are transferred to and temporarily stored in output circuit 50. Output circuit 50 comprises an encoding circuit 94 which takes all of this information and serializes it in the proper sequence and thereafter transfers same to storage circuit 96 wherein it is temporarily held. Storage circuit 96 may comprise a random access memory. The output of temporary storage circuit 96 is transferred through a transmission circuit 98 which may simply be a gate or the like, when the central processing unit C is ready to transfer the information back to the self-service terminal D.

Figure 7B:
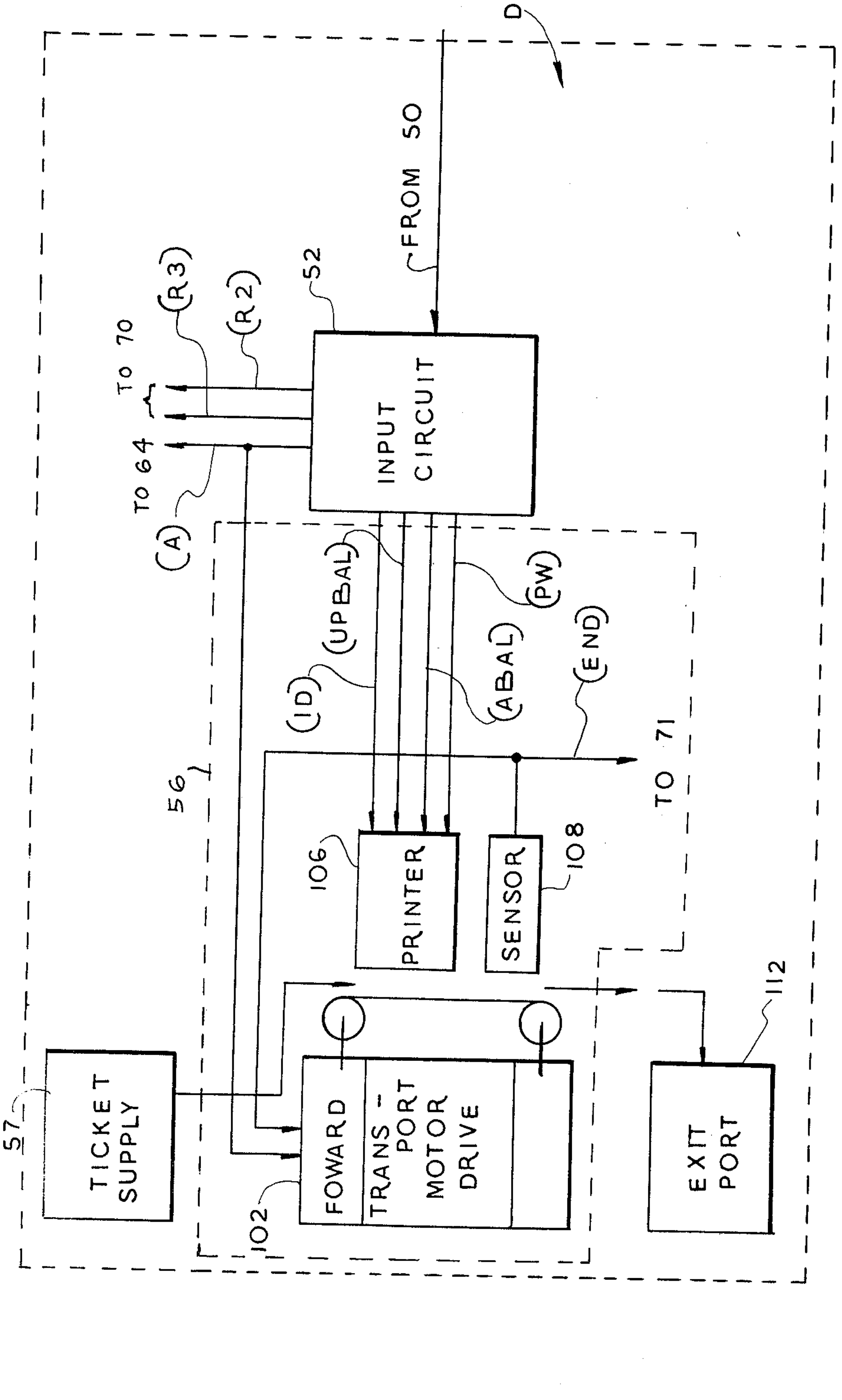
Figure 12:
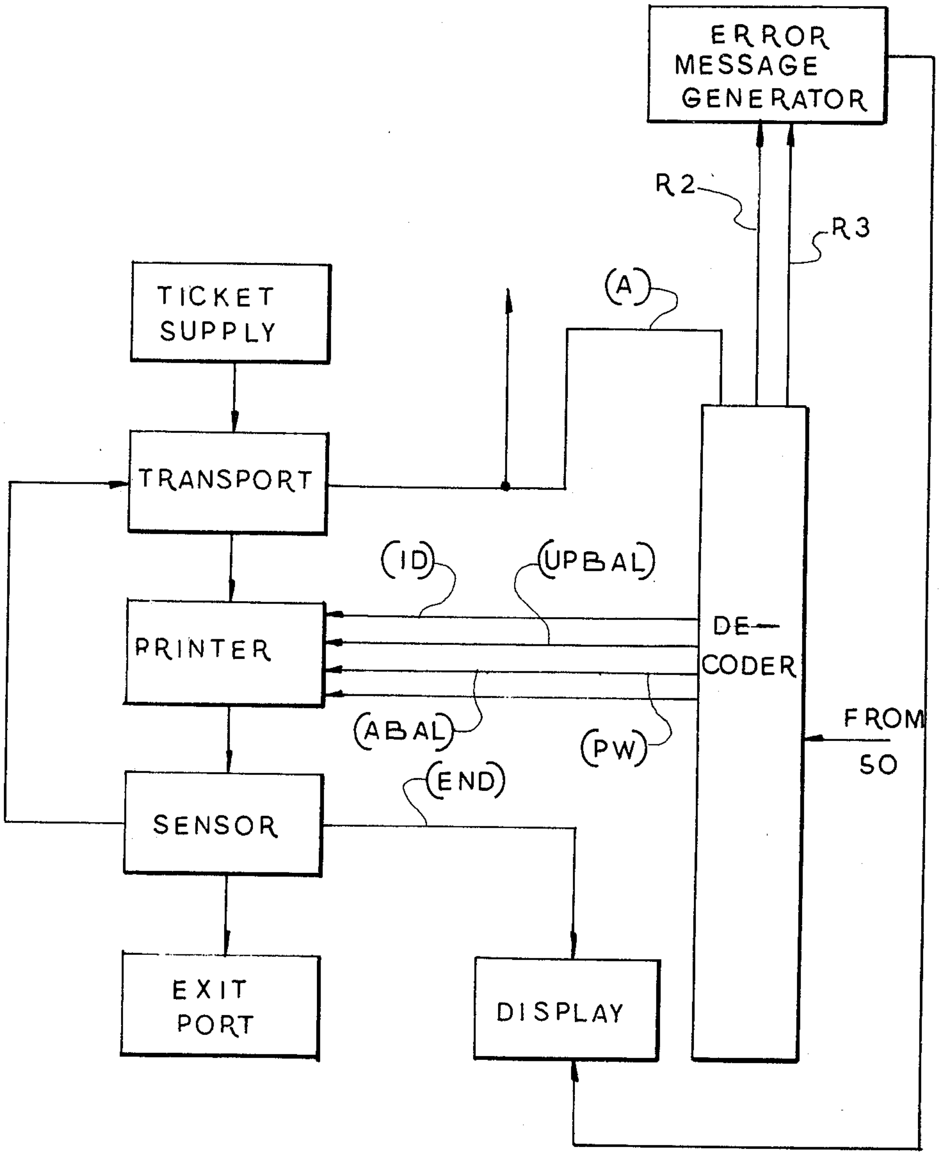
FIG. 12 is a flow diagram of the ticket issuing operation which takes place at the remote terminals of the first preferred embodiment of the present invention.

FIG. 12 is a flow diagram of the operations of the components of self-service terminal D, shown in FIG. 7B, which take place when a new ticket is issued. Assume now that the proposed wager has been accepted, the information in ticket transaction record memory 80 has been updated, and the information to be transferred from the central processing unit C back to self-service terminal D has been transmitted from output circuit 50 to input circuit 52. Input circuit 52, which includes a decoder, divides the incoming signal into its component portions and transfers same to the appropriate components in terminal D. During the time when the outstanding wagers are being processed and proposed wagers accepted in the central processing unit, the ticket is held in escrow within the ticket transport 30 (FIG. 7A) until the proposed wager is either accepted or rejected by the central processing unit. The signal transferred to input circuit 52 will contain either an acceptance signal (A), indicating that the proposed wager has been accepted, or one of two rejection signals, indicating that the proposed wager has been rejected because it is not valid (R2) (placed on a scratched horse, above the acceptable limits, etc.), or has been rejected for insufficient funds (R3).

If a rejection signal is present, the rejection signal is transferred from input circuit 52 to error message generator 70 which generates a signal (REV) to transport motor 64 which causes transport motor 64 to reverse its direction and move the ticket back to entrance port 60 (see FIGS. 7A and 9). Error message generator 70 causes display 71 to generate a message which advises the ticket holder as to the reason that the proposed wager has been rejected.

On the other hand, if an acceptance signal (A) is received by terminal D, input circuit 52 separates this signal and transfers it to transport motor 64, which causes the ticket to be transferred to a ticket storage bin 54 wherein it is retained. Further, acceptance signal (A) causes a new, blank ticket to be released and conveyed by a transport 102 from a ticket supply station 57 to a document printer 106.

Document printer 106 receives the new transaction record identification code (ID), accepted wager information (PW), the altered balance information (ABAL), and updated balance (UPBAL) information from input circuit 52 and prints same on the new ticket. Printer 106 may be any conventional print head, such as those used in AmTote TRV 280, TIM 350 and TIM 360 systems available from the American Totalisator Systems, Inc. of Hunt Valley, Maryland. When the printing of the ticket is completed, same is sensed by an end-print sensor 108 which automatically generates a signal (END) which stops the transport motor 102 which has now conveyed the printed ticket from the printer 106 to an exit port 112 such that it may be extracted from the terminal by the bettor. The operation of the system is thus complete. The signal (END) from the end-print sensor 108 is used to activate a "ready" light on the terminal display 71, indicating that the terminal is ready to receive the next ticket.

In a second preferred embodiment of the present invention, the previously described system is modified to reduce memory storage requirements by eliminating the necessity for recording credit balance information and information concerning outstanding wagers in the system. This is achieved by imprinting this information in machine-readable form on the ticket itself.

In this case, no identification codes are required and the tickets illustrated in FIGS. 2-6 are modified by imprinting machine-readable information, as well as customer-readable information, concerning credit balance and outstanding wagers directly on the ticket in space 22 or some other convenient space.

Figure 13:
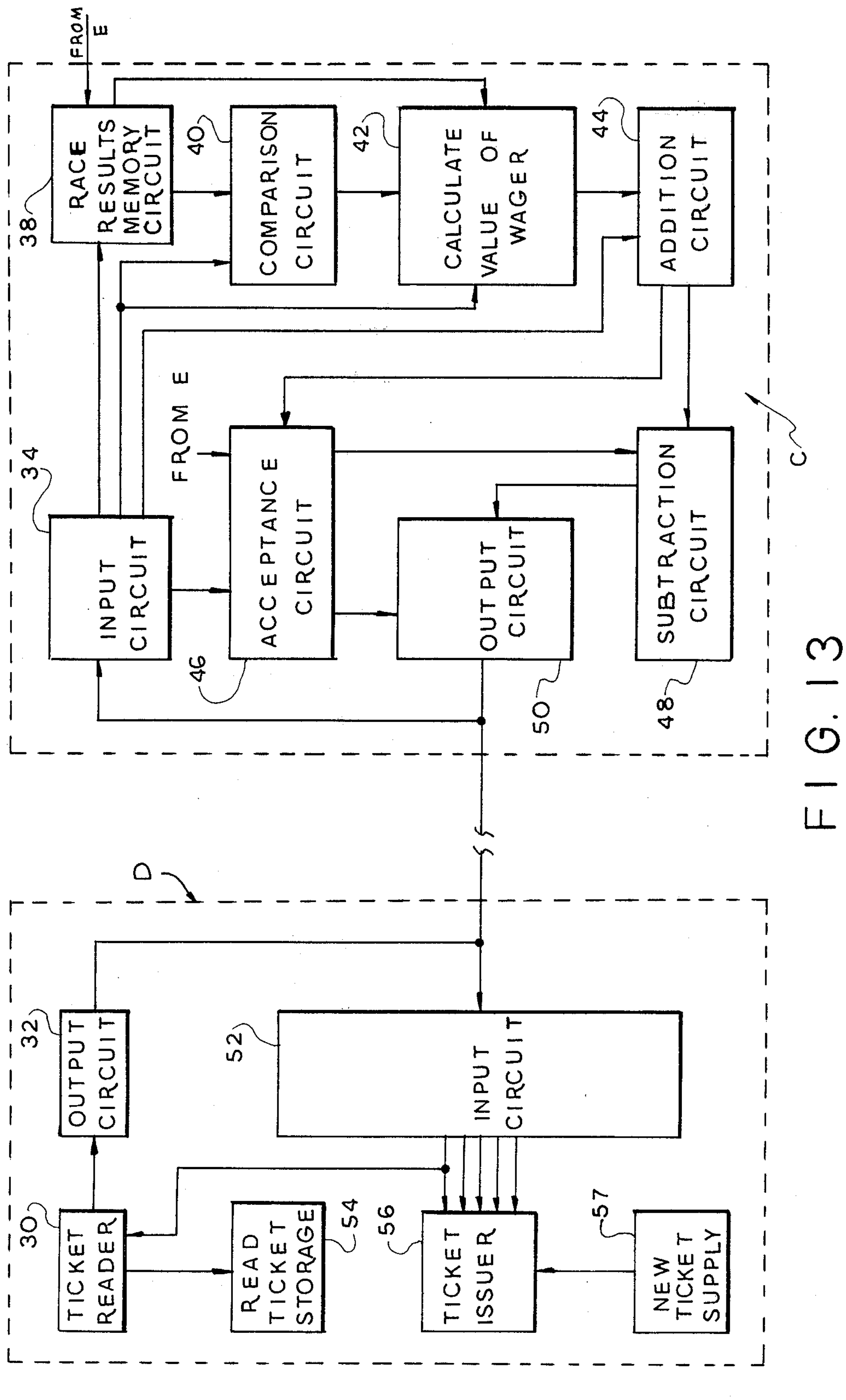
FIG. 13 is a block diagram of the central processing unit of a second preferred embodiment of the present invention.
Figure 14:
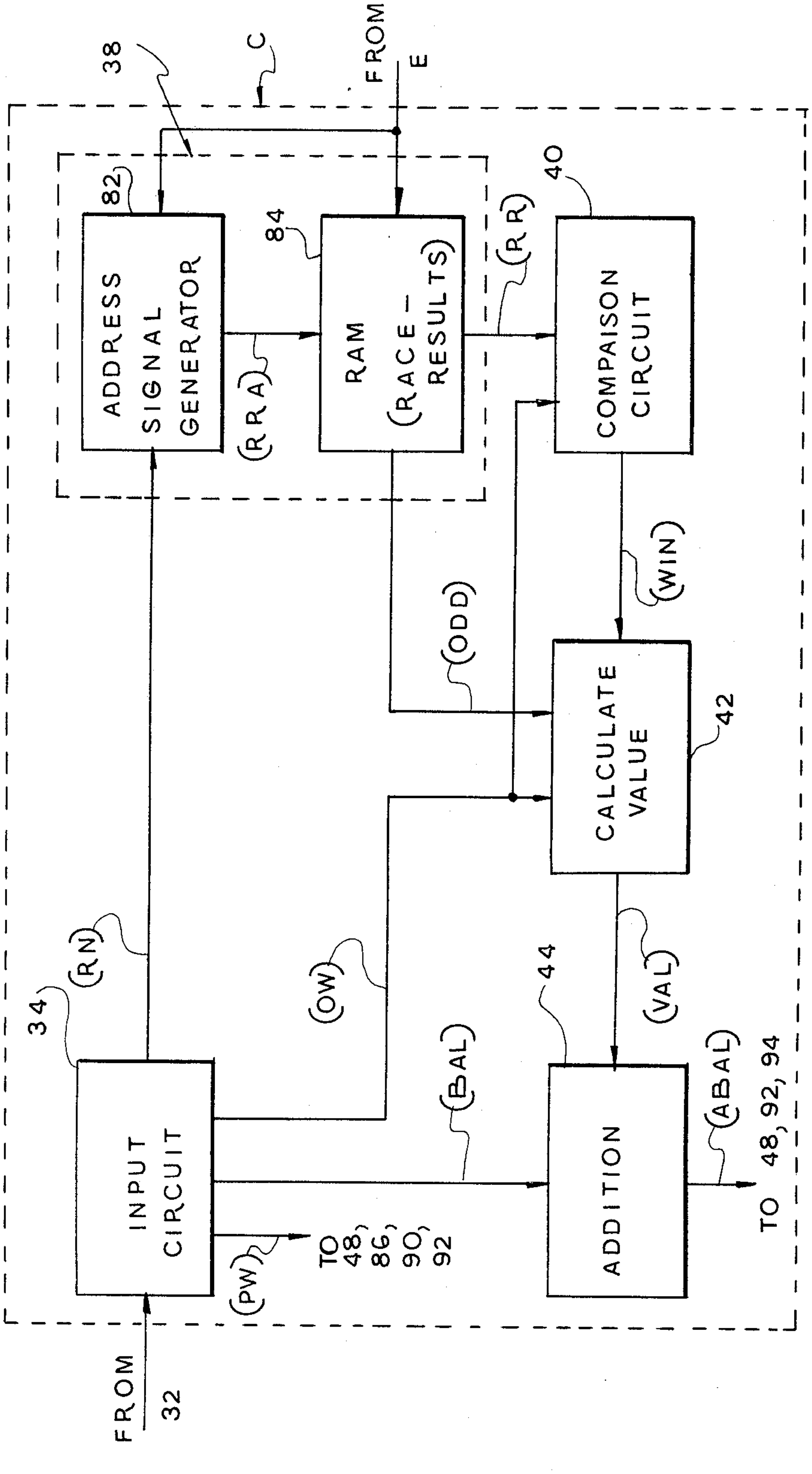
FIG. 14 is a more detailed block diagram of a portion of the second embodiment illustrated in FIG. 13.

As illustrated in FIGS. 13 and 14, ticket reader 30 reads information concerning the credit balance (BAL) and the outstanding wager (OW) from the ticket, along with the proposed wager information (PW). This information is transferred to output circuit 32 and thereafter to input circuit 34 of the central processing unit C.

A signal (RN) corresponding to the race to which the outstanding wager pertains is transferred to race results memory circuit 38 which, as before, causes address signal generator 82 to generate an address signal (RRA) to memory 84 which, in turn, generates a race results signal (RR) to comparison circuit 40. The other input (OW) to circuit 40 is transferred directly thereto from input circuit 34 and contains the information relating to the horse and the type of bet. If the information coincides, calculation circuit 42 is notified by a signal (WIN). The amount of the wager, also contained in the signal (OW) from input circuit 34, and the information concerning the odds of the various winners from memory 84, are transferred to calculation circuit 42 which calculates the payoff amount (VAL) to be added to the credit balance to form the altered balance (ABAL). This signal (VAL), along with the credit balance information (BAL), are transferred to addition circuit 44 which calculates the altered balance.

The remainder of the system operates as described above, except that no identification codes are generated and the credit balance and accepted wager information are imprinted in machine-readable form on the new ticket, along with the previously described information.

Figure 15:
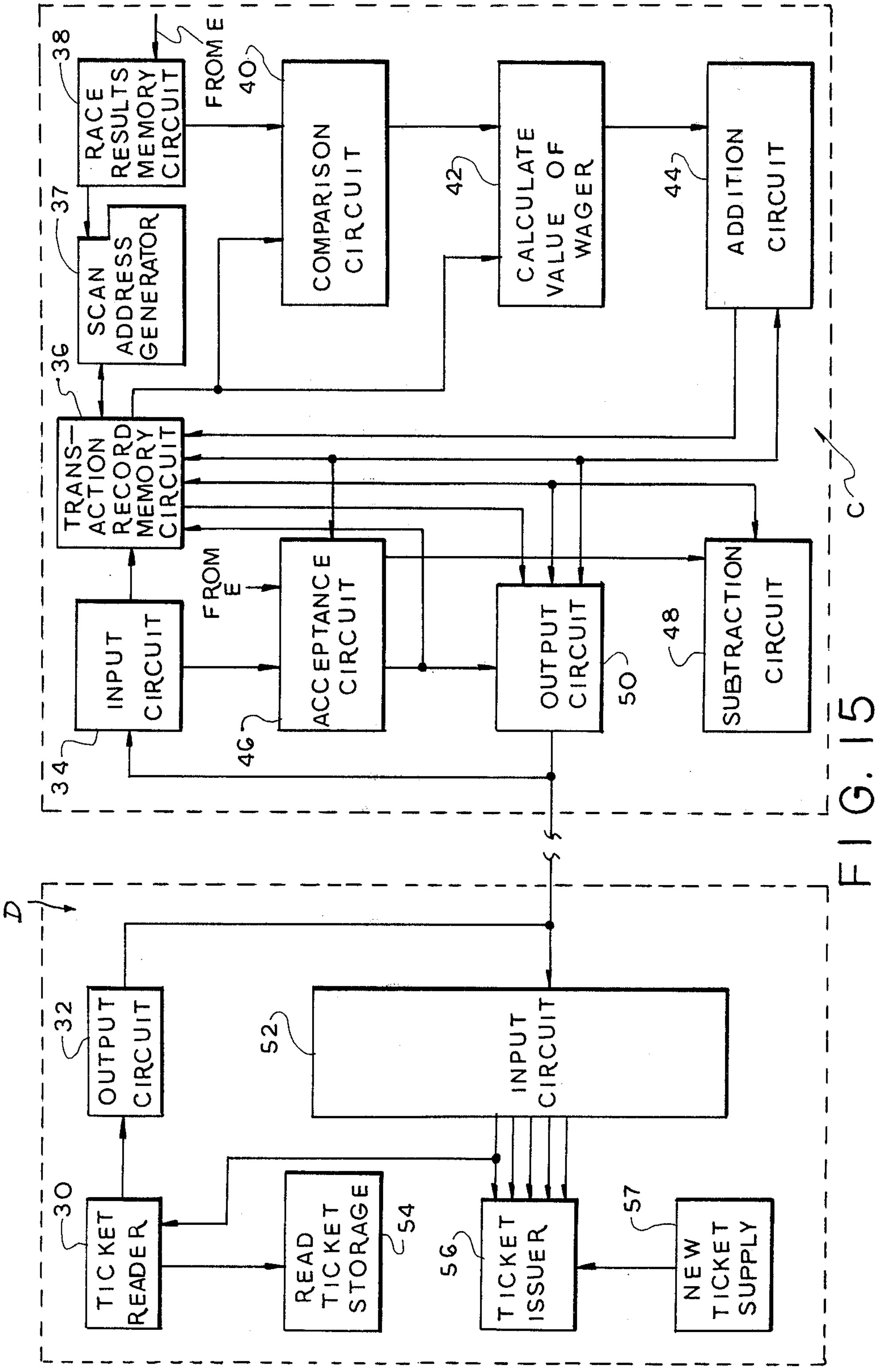
FIG. 15 is a block diagram of the central processing unit of a third preferred embodiment of the present invention.
Figure 16:
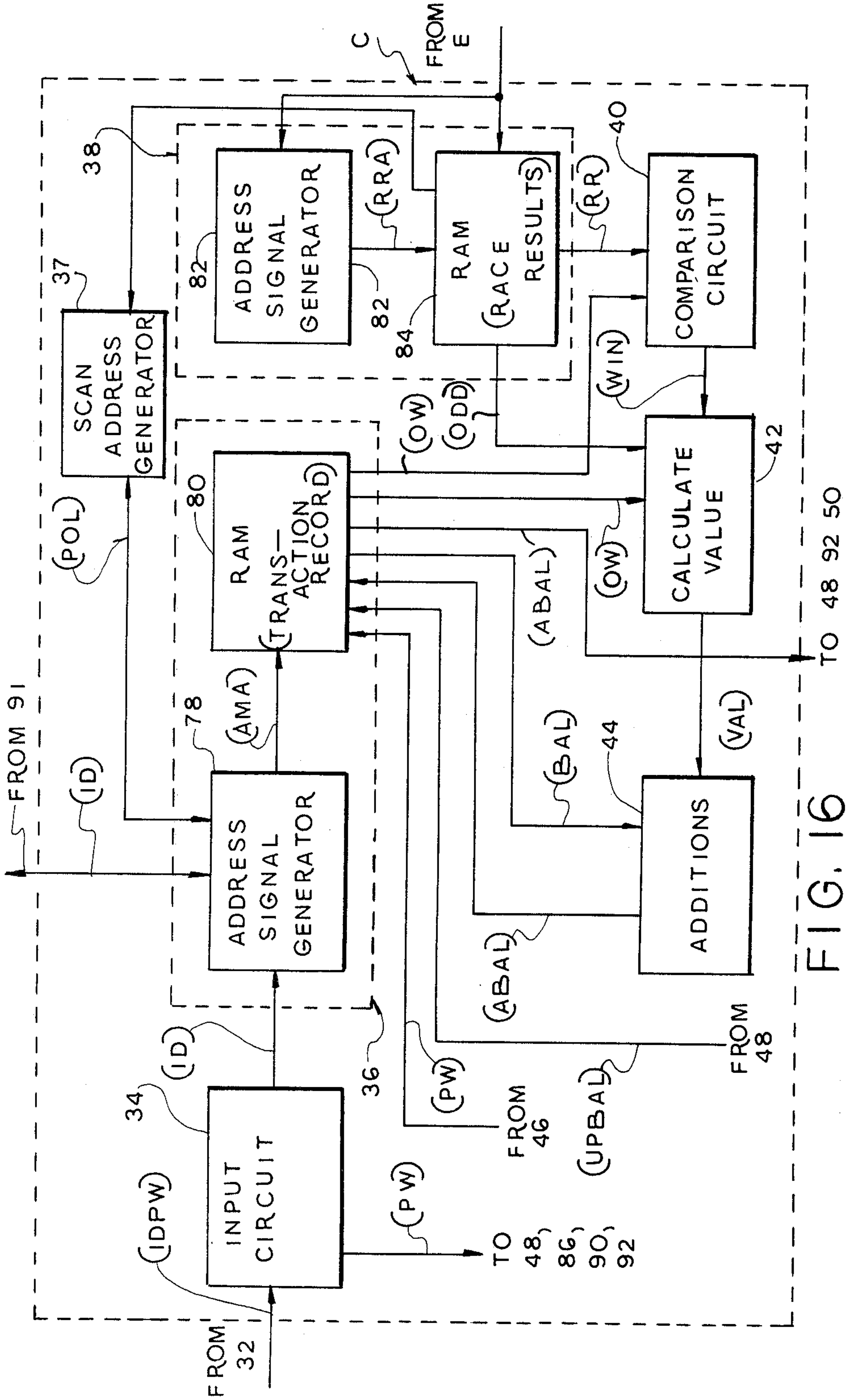
FIG. 16 is a more detailed block diagram of a portion of the third embodiment illustrated in FIG. 15.

In a third preferred embodiment of the present invention, as illustrated in FIGS. 15 and 16, the processing speed of ticket transactions is increased by pre-paying all winning accounts immediately after each race. This eliminates the necessity for determining whether a particular outstanding wager was a winner, and the value of same, during the time when new wagers are considered for acceptance. This same method could be, and often is, used for "end of day" operations wherein outstanding losing wagers are discarded and outstanding winning wagers credited. In this case, the newly updated information may be stored in a "previous day" section of the memory, if desired.

After the results of a recently completed race (or races) have been loaded into race results memory 84, a scan address generator circuit 37 is actuated and generates a series of signals (POL) to address signal generator 78 which causes address signal generator 78 to address each location in transaction record memory 80, in sequence. If the information at the first addressed location concerning the outstanding wager matches the race results (RR), when compared in comparison circuit 40, the value of the outstanding wager is calculated, as before, in circuit 42 and the altered balance is calculated in addition circuit 44. The altered balance (ABAL) information is then stored in memory 80 in the addressed location, for use when the next proposed wager is considered for the identification code corresponding to the transaction record in question, in the identical manner described above. If the outstanding wager information does not coincide with the race results, the balance for the transaction record remains unchanged and the next occupied memory location is considered. Each transaction record is considered in sequence. Polling of the memory terminates after each transaction record has been considered in turn and every winner credited.

The remainder of the system functions as described with respect to the first embodiment, except that altered balance information (ABAL) is now obtained from memory 80 when calculating the updated balance in circuit 48, making the comparison to determine the presence of sufficient funds to cover a proposed wager in circuit 92, and for transmission purposes in circuit 50, instead of directly from addition circuit 44, as before. In this manner, all winners are credited immediately after each race, instead of when the next proposed wager is considered for acceptance.

The present invention, as described above, contemplates the use of a form on each ticket upon which the bettor may enter information concerning a proposed wager. This system is believed to be preferable because it is easy to understand and simple for the bettor to use, thus resulting in a minimum of mistakes. However, as an alternative, each self-service terminal could be equipped with a keyboard input upon which the bettor can enter the proposed wager after his ticket is inserted. In this embodiment, the proposed wager information, instead of being read from the ticket, is obtained from the keyboard. The remainder of the system functions as previously described.

It will now be appreciated that the present invention relates to a self-service wagering system wherein a single cash deposit can be utilized for multiple race/multiple day wagering. This feature is provided without requiring the bettor to decide in advance the demonimation of each of the bets he wishes to make when the single cash deposit is made. Moreover, each transaction provides for ticket cashing, bet processing and credit balance updating in a quick, easy, errorless and confidential fashion. The ticket holder is always in possession of an acknowledgment of his current credit balance and information concerning outstanding wagers. Since each ticket transaction is identified only by a transaction record identification code, all wagers are anonymous.

The system of the present invention is readily usable for both on-track and off-track betting and provides a number of terminals which may be situated at a plurality of locations to permit convenient and easy betting. The system requires a minimum of money handling, reducing the number of possible mistakes and increasing security. Moreover, wagers are accepted and outstanding bets paid automatically without any voice communication, in a single confidential transaction.

While only a limited number of preferred embodiments of the present invention have been disclosed herein for purposes of illustration, it is obvious that many modifications and variations could be made thereto. It is intended to cover all of these modifications and variations which fall within the scope of the present invention, as defined by the following claims:

I claim:

1. A self-service wagering system of the type incorporating a means for storing the credit balance and information relating to an outstanding wager previously placed on a completed race, for each of a plurality of transactions, and means for obtaining information relating to the results of a completed race, the system being adapted to accept a previously issued ticket bearing a transaction identification code and a form upon which information relating to a proposed wager on an upcoming race may be entered by the ticket holder, the system comprising: means for reading the ticket to obtain the identification code and entered information, if any, relating to the proposed wager; means for accessing the memory location corresponding to the read identification code to obtain stored credit balance and outstanding wager information, if any, for the identified transaction; means for obtaining the results of the race corresponding to the outstanding wager; means for comparing the outstanding wager information with the race results; means for calculating the value of the outstanding wager; means for adding said calculated value to the stored credit balance, to form an altered balance; means for accepting the proposed wager, if any; means for generating an identification code corresponding to said accepted wager; means for subtracting, from said altered balance, the value of said accepted wager to form an updated credit balance; means for storing, in a memory location corresponding to said identification code corresponding to said accepted wager, information concerning said updated credit balance and said accepted wager; and means for issuing a ticket bearing the identification code corresponding to said accepted wager, an acknowledgement of said updated credit balance, an acknowledgement of said accepted wager, if any, and a form upon which may be entered information relating to a further proposed wager on a race to take place subsequent to the upcoming race.

2. The system of claim 1, further comprising a ticket entrance port and means for conveying the ticket from said entrance port to said reading means after the insertion thereof into said entrance port.

3. The system of claim 1, further comprising means for holding the ticket in escrow after same is read by said reading means.

4. The system of claim 2, further comprising means for holding the ticket in escrow after same is read by said reading means.

5. The system of claim 4, wherein said holding means comprises means for deactuating said conveying means.

6. The system of claim 1, wherein said reading means comprises means for verifying the form of the read identification code.

7. The system of claim 2, wherein said reading means comprises means for verifying the form of the read identification code.

8. The system of claim 7, wherein said verifying means comprises means for generating a first rejection signal if the read code is in improper form, and means for actuating said conveyor means to move said document from said reading means to said entrance port in response to said first rejection signal.

9. The system of claim 7, wherein said accepting means comprises means for obtaining information on possible valid wagers on the race to which the proposed wager pertains and means for comparing the read information relating to the proposed wager with said information concerning possible valid wagers.

10. The system of claim 9, further comprising means for generating a second rejection signal if the information relating to the proposed wager does not coincide with the information concerning possible valid wagers for the race to which the proposed wager pertains, and means for actuating said conveying means to move said document from said reading means to said entrance port in response to said second rejection signal.

11. The system of claim 1, wherein said accepting means comprises means for obtaining information on possible valid wagers on the race to which the proposed wager pertains and means for comparing the read information relating to the proposed wager with said information concerning possible valid wagers.

12. The system of claim 11, wherein said obtaining means comprises means for storing information relating to possible valid wagers for the race to which the proposed wager pertains and means for accessing said storage means to obtain said information.

13. The system of claim 11, further comprising means for generating an acceptance signal if the information relating to the proposed wager coincides with said possible valid wagers for the race to which the proposed wager pertains.

14. The system of claim 13, further comprising a plurality of new tickets and means for dispensing one of said new tickets upon receipt of said acceptance signal.

15. The system of claim 14, further comprising means for conveying a new ticket from said dispensing means to said ticket issuing means.

16. The system of claim 13, further comprising means for retaining the read ticket, said retaining means comprising ticket storage means and means for conveying the ticket from said reading means to said storage means.

17. The system of claim 16, wherein said means for conveying the ticket to said storage means is actuated by said acceptance signal.

18. The system of claim 13, wherein said issuing means is actuated by said acceptance signal.

19. The system of claim 1, further comprising means for retaining the read ticket.

20. The system of claim 19, wherein said retaining means comprises ticket storage means and means for conveying the ticket from said reading means to said storage means.

21. The system of claim 1, wherein said issuing means comprises means for issuing a new ticket.

22. The system of claim 1, wherein said issuing means comprises means for printing the identification code corresponding to the accepted wager, an acknowledgment of updated credit balance and an acknowledgment of the accepted proposed wager on the new ticket.

23. The system of claim 22, wherein said issuing means further comprises means for generating a termination signal after said printing means has completed the printing operation.

24. The system of claim 23, further comprising a ticket exit port and means for conveying the new ticket from said issuing means to said exit port when said termination signal is received.

25. A wagering method for use in conjunction with a system capable of storing the credit balance and information relating to an outstanding wager, if any, previously placed on a completed race, for each of a plurality of transactions, and having access to information relating to the results of a completed race, the system being adapted to accept a previously issued ticket bearing an identification code and a form upon which information relating to a proposed wager on the upcoming race may be entered by a ticket holder, the method comprising the steps of:

(a) reading the identification code and entered information relating to the proposed wager, if present;
(b) accessing the storage location corresponding to the read identification code to obtain stored credit balance and outstanding wager information pertaining to the transaction corresponding to the read identification code, if any;
(c) obtaining information corresponding to the results of the race to which the outstanding wager pertains;
(d) comparing the outstanding wager information with the results of the race;
(e) calculating the value of the outstanding wager;
(f) adding the calculated value to the credit balance to form an altered balance;
(g) accepting the proposed wager, if any;
(h) assigning an identification code corresponding to the accepted wager;
(i) subtracting, from the altered balance, the value of the accepted wager to form an updated balance; and
(j) issuing a ticket bearing the identification code corresponding to the accepted wager, an acknowledgment of the updated balance, an acknowledgment of the accepted wager and a form upon which may be entered information relating to a further proposed wager on a race subsequent to the upcoming race.

26. The method of claim 25, wherein the system has an entrance port and further comprising the step of conveying the ticket from the entrance port to the ticket reader after same is inserted in the entrance port.

27. The method of claim 25, further comprising the step of holding the ticket in escrow after same is read.

28. The method of claim 26, further comprising the step of holding the ticket in escrow after same is read.

29. The method of claim 28, wherein the step of holding comprises the step of preventing the conveyance of the ticket from the reader.

30. The method of claim 25, wherein the step of reading comprises the step of verifying the form of the read identification code.

31. The method of claim 26, wherein the step of reading comprises the step of verifying the form of the read identification code.

32. The method of claim 31, further comprising the steps of generating a first rejection signal if the read code is in improper form and conveying the ticket from the reader to the entrance port in response to the first rejecting signal.

33. The method of claim 25, wherein the step of accepting comprises the step of comparing the read information relating to a proposed wager for an upcoming race with information concerning possible valid wagers thereon.

34. The method of claim 33, wherein the information relating to possible valid wagers for the upcoming race is stored in a memory and wherein the step of comparing the read information relating to a proposed wager with the possible valid wagers further comprises the step of accessing the memory to obtain information relating to possible valid wagers for the upcoming race.

35. The method of claim 33, wherein the step of comparing comprises the steps of generating a second rejection signal if the information relating to the proposed wager does not coincide with the information concerning possible valid wagers for the race to which the proposed wager pertains and conveying the ticket from the reader to the entrance port in the presence of the second rejection signal.

36. The method of claim 33, wherein the step of accepting comprises generating an acceptance signal if the information relating to the proposed wager coincides with the possible valid wagers for the race to which the proposed wager pertains.

37. The method of claim 36, wherein the terminal has a plurality of new tickets and further comprising the step of dispensing a new ticket in the presence of an acceptance signal.

38. The method of claim 37, wherein the step of issuing further comprises the step of conveying the dispensed new ticket to a printer.

39. The method of claim 25, further comprising the step of retaining the read ticket.

40. The method of claim 36, further comprising the step of retaining the read ticket, said step of retaining the ticket comprising the step of storing same after it is read.

41. The method of claim 40, wherein the step of storing comprises conveying the ticket to a storage bin in the presence of the acceptance signal.

42. The method of claim 36, wherein the step of issuing comprises the step of issuing a new ticket in the presence of the acceptance signal.

43. The method of claim 25, wherein the step of issuing comprises the step of printing the identification code corresponding to the accepted wager, an acknowledgment of the updated credit balance and an acknowledgment of the accepted wager on a new ticket.

44. The method of claim 43, wherein the system has an exit port and wherein the step of issuing comprises the step of conveying the new ticket to the exit port after same is printed.

45. A self-service wagering system of the type having access to the race results of a completed race, and adapted to accept a ticket containing information concerning a credit balance, an outstanding wager on the completed race and a proposed wager on an upcoming race, if any, said system comprising means for reading the ticket to obtain the information entered thereon; means for obtaining the race results; means for comparing the read outstanding wager information with the race results; means for calculating the value of the outstanding wager; means for accepting the proposed wager, if any, means for adding the calculated value of the outstanding wager; and means for subtracting, from the read credit balance, the value of the accepted wager, to form an updated credit balance and means for issuing a new ticket bearing said updated credit balance and accepted wager information and a form upon which may be entered information relating to a further proposed wager.

46. The system of claim 45, further comprising a ticket entrance port and means for conveying the ticket from said entrance port to said reading means after the insertion thereof into said entrance port.

47. The system of claim 46, further comprising means for holding the ticket in escrow after same is read by said reading means.

48. The system of claim 45, wherein said accepting means comprises means for obtaining information concerning possible valid wagers on the race to which the proposed wager pertains and means for comparing the read information relating to the proposed wager with said obtained information.

49. The system of claim 48, wherein said obtaining means comprises means for storing information relating to possible valid wagers for the race to which the proposed wager pertains and means for accessing said storage means to obtain information relating to said possible valid wagers.

50. The system of claim 45, further comprising means for retaining the read ticket.

51. A wagering method for use in conjunction with a system having access to information pertaining to the results of a completed race and being adapted to accept a previously issued ticket bearing information relating to a credit balance, an outstanding wager for the completed race and a proposed wager for an upcoming race, if any, the method comprising the steps of:

(a) reading the information from the ticket;

(b) accessing the race results information to obtain the results of the completed race;

(c) comparing the read outstanding wager information with said race results;

(d) calculating the value of the outstanding wager;

(e) accepting the proposed wager, if any;

(f) adding the calculated value and subtracting the value of the accepted wager from the read credit balance to form an updated credit balance;

(g) issuing a ticket bearing machine-readable credit balance and accepted wager information, and a form upon which may be entered information relating to a further proposed wager.

52. The method of claim 51, wherein the system has an entrance port and further comprising the step of conveying the ticket from the entrance port to a ticket reader after same is inserted in the entrance port.

53. The method of claim 51, further comprising the step of holding the ticket in escrow after same is read.

54. The method of claim 51, wherein the step of accepting comprises the steps of obtaining information concerning possible valid wagers on the race to which the proposed wager pertains and comparing the read information relating to the proposed wager with information concerning possible valid wagers.

55. The method of claim 54, wherein information relating to possible valid wagers for the upcoming race is stored in a memory and wherein the step of comparing the read information relating to a proposed wager with the possible valid wagers further comprises the step of accessing rhe memory to obtain information relating to possible valid wagers for the upcoming race.

56. The method of claim 55, wherein the step of comparing comprises the steps of generating a second rejection signal if the information relating to the proposed wager does not coincide with the information concerning possible valid wagers for the race to which the proposed wager pertains and conveying the ticket from the reader to the entrance port in the presence of the second rejection signal.

57. The method of claim 55, wherein the step of accepting comprises generating an acceptance signal if the information relating to the proposed wager coincides with the possible valid wagers for the race to which the proposed wager pertains.

58. The method of claim 51, wherein the step of issuing further comprises the step of conveying the dispensed new ticket to a printer.

59. The method of claim 51, further comprising the step of retaining the read ticket.

60. A self-service wagering system of the type incorporating a memory having a plurality of storage locations, each of which is capable of storing the credit balance and information relating to an outstanding wager previously placed on a completed race, for one of a plurality of ticket transactions and having access to information relating to the results of said completed race, the system being adapted to accept a previously issued ticket bearing an identification code and a form upon which information relating to a proposed wager on an upcoming race may be entered, the system comprising means for accessing each storage location, in sequence, after the completion of said race; means for comparing the outstanding wager information from the accessed location with the race results to determine whether same coincide; means for calculating the value of the outstanding wager from the accessed location; means for altering the stored credit balance from each accessed location by adding said calculated value to said credit balance stored therein; means for reading the ticket to obtain the identification code and entered information, if any, relating to the proposed wager; means for accessing the storage location corresponding to the read identification code to obtain the altered credit balance stored therein; means for accepting the proposed wager, if any; means for generating an identification code corresponding to said accepted wager; means for subtracting, from the altered balance, the value of the accepted wager, to form an updated credit balance; means for storing, in a storage location corresponding to said generated identification code, information concerning the updated balance and accepted wager; and means for issuing a ticket bearing said generated identification code, an acknowledgment of the updated credit balance, an acknowledgment of the accepted wager, if any, and a form upon which may be entered information relating to a further proposed wager on a race to take place subsequent to the upcoming race.

61. The system of claim 60, further comprising a ticket entrance port and means for conveying the ticket from said entrance port to said reading means after the insertion thereof into said entrance port.

62. The system of claim 60, further comprising means for holding the ticket in escrow after same is read by said reading means.

63. The system of claim 62, wherein said holding means comprises means for deactuating said conveying means.

64. The system of claim 60, wherein said reading means comprises means for verifying the form of the read identification code.

65. The system of claim 64, wherein said verifying means comprises means for generating a first rejection signal if the read code is in improper form, and means for actuating said conveyor means to move said ticket from said reading means to said entrance port in response to said first rejection signal.

66. The system of claim 60, wherein said accepting means comprises means for comparing the read information relating to the proposed wager with information concerning possible valid wagers on the race to which the proposed wager pertains.

67. The system of claim 66, wherein said comparison means comprises means for storing information relating to possible valid wagers for the race to which the proposed wager pertains and means for accessing said storage means to obtain information relating to said possible valid wagers.

68. The system of claim 66, further comprising means for generating a second rejection signal if the information relating to the proposed wager does not coincide with the information concerning possible valid wagers for the race to which the proposed wager pertains, and means for actuating said conveying means to move said ticket from said reading means to said entrance port in response to said second rejection signal.

69. The system of claim 66, further comprising means for generating an acceptance signal if the information relating to the proposed wager coincides with the possible valid wagers for the race to which the proposed wager pertains.

70. The system of claim 69, further comprising a plurality of new tickets and means for dispensing one of said new tickets upon receipt of said acceptance signal.

71. A wagering method for use in conjunction with a system incorporating a memory having a plurality of storage locations, each of which contains the credit balance and information relating to an outstanding wager, if any, previously placed on a completed race, for one of a plurality of transactions, and having access to information relating to the results of the completed race, the system being adapted to accept a previously issued ticket bearing a machine-readable identification code and a form upon which machine-readable information relating to a proposed wager on the upcoming race may be entered by a ticket holder, the method comprising the steps of:

(a) scanning the memory to determine which outstanding wagers stored therein coincide with the race results, calculating the value of each wager which is determined to coincide, adding the respective calculated values to the stored credit balances at each location containing a coinciding outstanding wager, so as to form an altered balance for each;

(b) reading the identification code and entered information relating to the proposed wager, if present;

(c) accessing the memory location corresponding to the read identification code to obtain the altered credit balance stored thereat;

(d) accepting the proposed wager, if any;

(e) assigning an identification code corresponding to the accepted wager;

(f) subtracting, from the stored altered balance, the value of the accepted wager to form an updated balance; and, (g) issuing a ticket bearing the identification code corresponding to the accepted wager, an acknowledgment of the updated balance, an acknowledgment of the accepted wager and a form upon which may be entered information relating to a further proposed wager on a race subsequent to the upcoming race.

72. The method of claim 71, wherein the system has an entrance port and further comprising the step of conveying the ticket from the entrance port to the ticket reader after same is inserted in the entrance port.

73. The method of claim 71, further comprising the step of holding the ticket in escrow after same is read.

74. The method of claim 71, wherein the step of reading comprises the step of verifying the form of the read identification code.

75. The method of claim 74, further comprising the steps of generating a first rejection signal if the read code is in improper form and conveying the ticket from the reader to the entrance port in response to the first rejecting signal.

76. The method of claim 75, wherein the step of accepting comprises the step of comparing the read information relating to a proposed wager for an upcoming race with information concerning possible valid wagers thereon.

77. The method of claim 76, wherein the memory has a location containing information relating to possible valid wagers for the upcoming race and wherein the step of comparing the read information relating to a proposed wager with the possible valid wagers further comprises the step of accessing the memory to obtain information relating to possible valid wagers for the upcoming race.

78. The method of claim 76, wherein the step of comparing comprises the steps of generating a second rejection signal if the information relating to the proposed wager does not coincide with the information concerning possible valid wagers for the race to which the proposed wager pertains and conveying the ticket from the reader to the entrance port in the presence of the second rejection signal.

79. The method of claim 76, wherein the step of accepting comprises generating an acceptance signal if the information relating to the proposed wager coincides with the possible valid wagers for the race to which the proposed wager pertains.

80. The method of claim 79, wherein the terminal has a plurality of new tickets and further comprising the step dispensing a new ticket in the presence of an acceptance signal.

81. The method of claim 71, wherein the step of issuing comprises the step of printing the identification code corresponding to the accepted wager, an acknowledgment of the updated credit balance and an acknowledgment of the accepted wager on a new ticket.

* * * * *